United States Patent
Sharma et al.

(10) Patent No.: US 10,838,717 B2
(45) Date of Patent: Nov. 17, 2020

(54) REPRESENTING A SOFTWARE APPLICATION USING EXTENDED REALITY

(71) Applicant: Accenture Global Solutions Limited, Dublin (IE)

(72) Inventors: Vibhu Saujanya Sharma, Bangalore (IN); Rohit Mehra, Delhi (IN); Sanjay Podder, Thane (IN); Vikrant S. Kaulgud, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 123 days.

(21) Appl. No.: 16/113,583

(22) Filed: Aug. 27, 2018

(65) Prior Publication Data

US 2019/0278591 A1 Sep. 12, 2019

(30) Foreign Application Priority Data

Feb. 16, 2018 (IN) .............................. 201841006006

(51) Int. Cl.
*G06F 8/20* (2018.01)
*G06F 8/73* (2018.01)
*G06F 8/75* (2018.01)

(52) U.S. Cl.
CPC .................. *G06F 8/75* (2013.01); *G06F 8/20* (2013.01); *G06F 8/73* (2013.01)

(58) Field of Classification Search
CPC .... G06F 3/011; G06F 3/0482; G06F 3/04815; G06F 8/20; G06F 8/75; G06F 11/3664; G06F 8/73
See application file for complete search history.

(56) References Cited

U.S. PATENT DOCUMENTS

| | | | |
|---|---|---|---|
| 2004/0046763 A1* | 3/2004 | Ball | G06F 11/3616 345/581 |
| 2012/0272220 A1* | 10/2012 | Calcagno | G06F 8/77 717/125 |
| 2013/0047155 A1* | 2/2013 | Caspole | G06F 9/445 718/1 |
| 2019/0004793 A1* | 1/2019 | Brebner | H04W 4/80 |

* cited by examiner

*Primary Examiner* — S. Sough
*Assistant Examiner* — Cheneca Smith
(74) *Attorney, Agent, or Firm* — Harrity & Harrity, LLP

(57) ABSTRACT

A device may perform a static analysis of a codebase associated with a software application to determine a structure of the codebase and one or more metrics associated with the codebase. The device may generate a structured format of the codebase based on the structure of the codebase. The device may generate a domain specific language format of the codebase based on the structured format of the codebase and the one or more metrics associated with the codebase. The device may generate an extended reality rendered view of the domain specific language format of the codebase. The device may provide, to an extended reality device, the extended reality rendered view of the domain specific language format of the codebase.

20 Claims, 13 Drawing Sheets

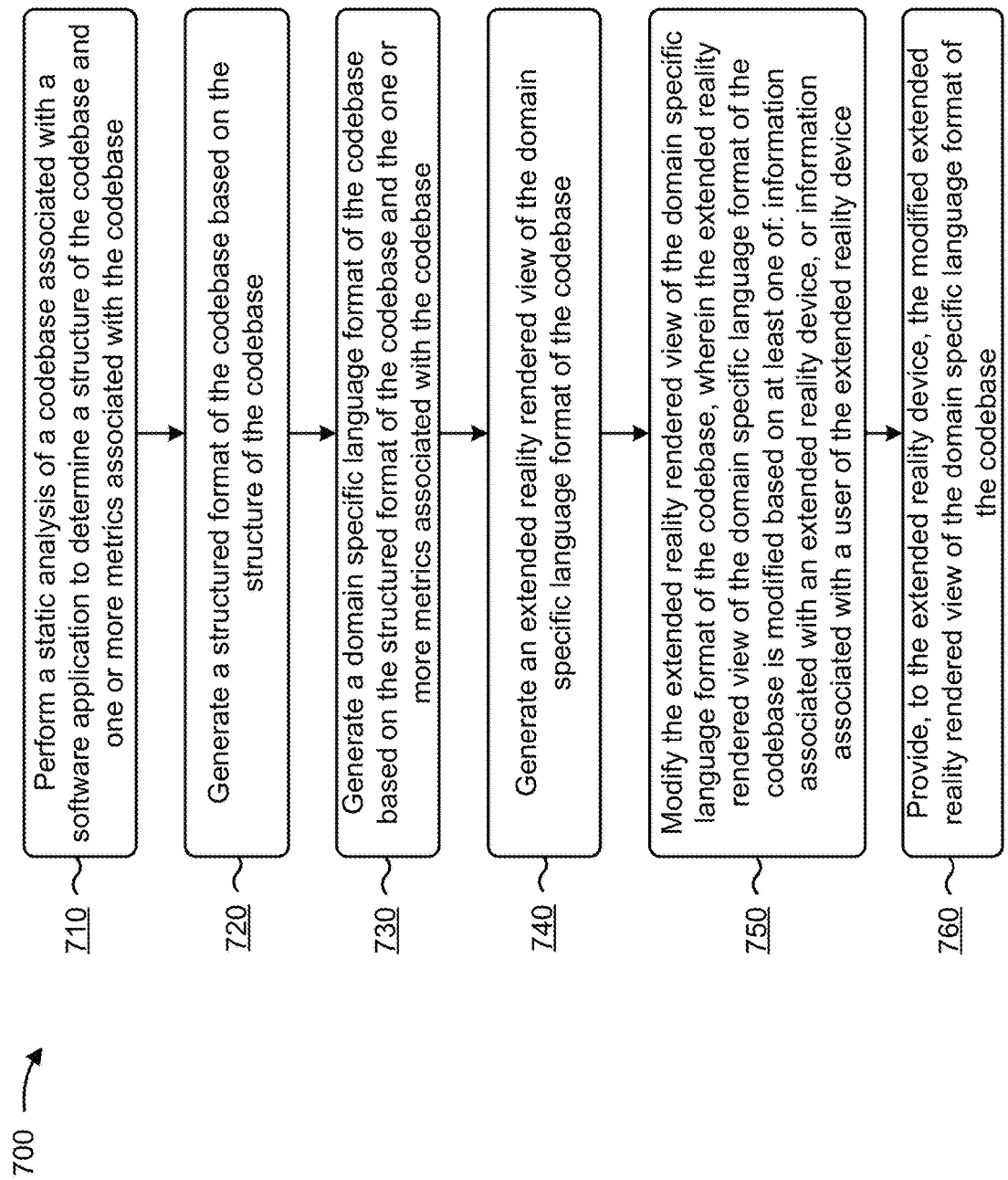

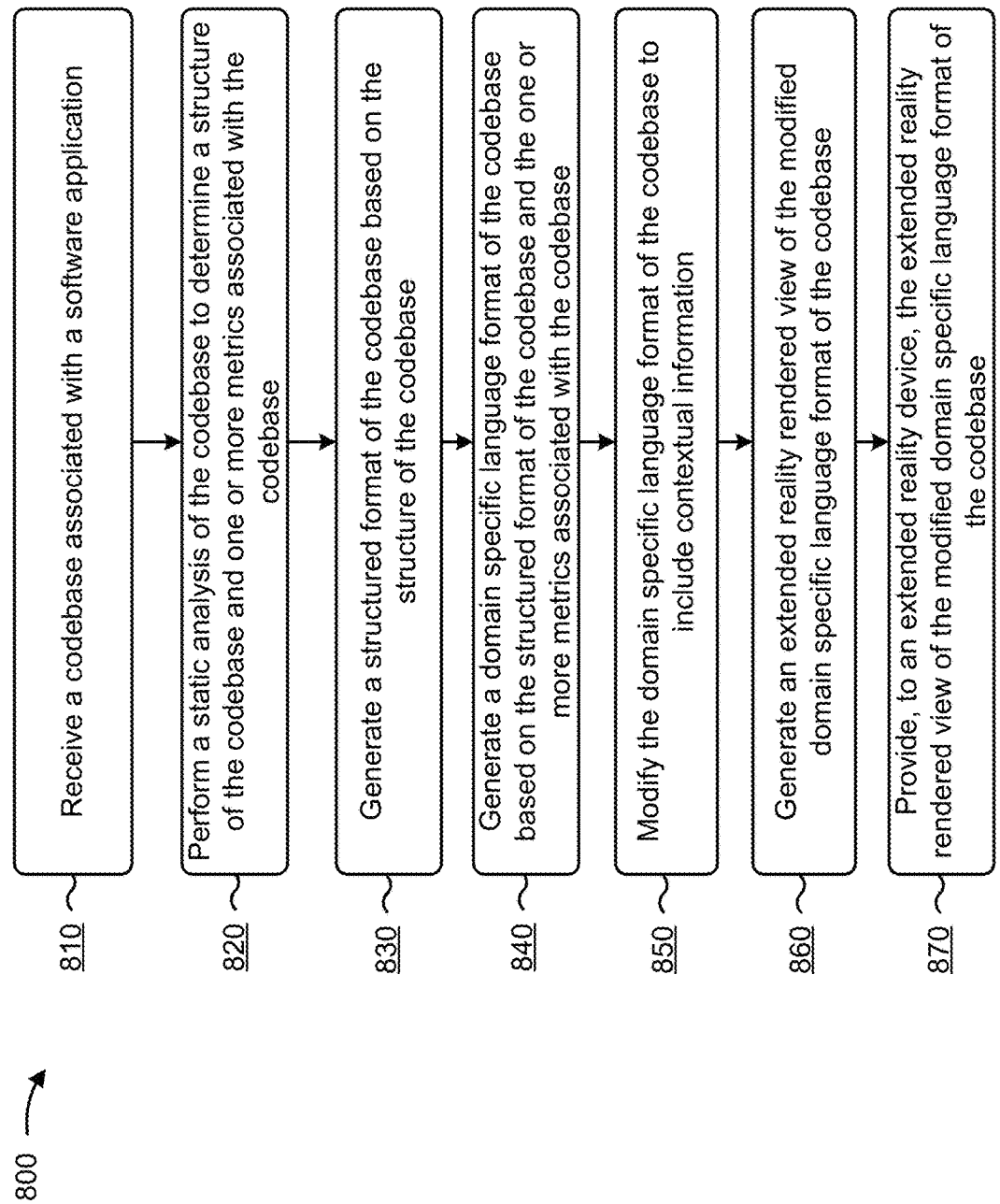

REPRESENTING A SOFTWARE APPLICATION USING EXTENDED REALITY

RELATED APPLICATION

This application claims priority under 35 U.S.C. § 119 to Indian Patent Application No. 201841006006, filed on Feb. 16, 2018, the content of which is incorporated by reference herein in its entirety.

BACKGROUND

Rapid advances are being made in extended reality devices, such as augmented reality devices, virtual reality devices, mixed reality devices, and/or the like. Some studies indicate that immersive experiences with extended reality devices leverage affordances of natural human perception (e.g., spatial memory, motion, manipulation, feedback, and/or the like) for better comprehension of three-dimensional (3D) visualizations and enhanced creativity.

SUMMARY

According to some implementations, a device may include one or more memories, and one or more processors, communicatively coupled to the one or more memories, to perform a static analysis of a codebase associated with a software application to determine a structure of the codebase and one or more metrics associated with the codebase. The one or more processors may generate a structured format of the codebase based on the structure of the codebase. The one or more processors may generate a domain specific language format of the codebase based on the structured format of the codebase and the one or more metrics associated with the codebase. The one or more processors may generate an extended reality rendered view of the domain specific language format of the codebase. The one or more processors may provide, to an extended reality device, the extended reality rendered view of the domain specific language format of the codebase.

According to some implementations, a method may include performing, by a device, a static analysis of a codebase associated with a software application to determine a structure of the codebase and one or more metrics associated with the codebase. The method may include generating, by the device, a structured format of the codebase based on the structure of the codebase. The method may include generating, by the device, a domain specific language format of the codebase based on the structured format of the codebase and the one or more metrics associated with the codebase. The method may include generating, by the device, an extended reality rendered view of the domain specific language format of the codebase. The method may include modifying, by the device, the extended reality rendered view of the domain specific language format of the codebase, wherein the extended reality rendered view of the domain specific language format of the codebase is modified based on at least one of information associated with an extended reality device, or information associated with a user of the extended reality device. The method may include providing, by the device and to the extended reality device, the modified extended reality rendered view of the domain specific language format of the codebase.

According to some implementations, a non-transitory computer-readable medium may store instructions that include one or more instructions that, when executed by one or more processors of a device, cause the one or more processors to receive a codebase associated with a software application. The one or more instructions may cause the one or more processors to perform a static analysis of the codebase to determine a structure of the codebase and one or more metrics associated with the codebase. The one or more instructions may cause the one or more processors to generate a structured format of the codebase based on the structure of the codebase. The one or more instructions may cause the one or more processors to generate a domain specific language format of the codebase based on the structured format of the codebase and the one or more metrics associated with the codebase. The one or more instructions may cause the one or more processors to modify the domain specific language format of the codebase to include contextual information. The one or more instructions may cause the one or more processors to generate an extended reality rendered view of the modified domain specific language format of the codebase. The one or more instructions may cause the one or more processors to provide, to an extended reality device, the extended reality rendered view of the modified domain specific language format of the codebase.

BRIEF DESCRIPTION OF THE DRAWINGS

FIG. 7 is a flow chart of an example process for representing a software application using extended reality.

FIG. 8 is a flow chart of an example process for representing a software application using extended reality.

DETAILED DESCRIPTION

Figure 1A:
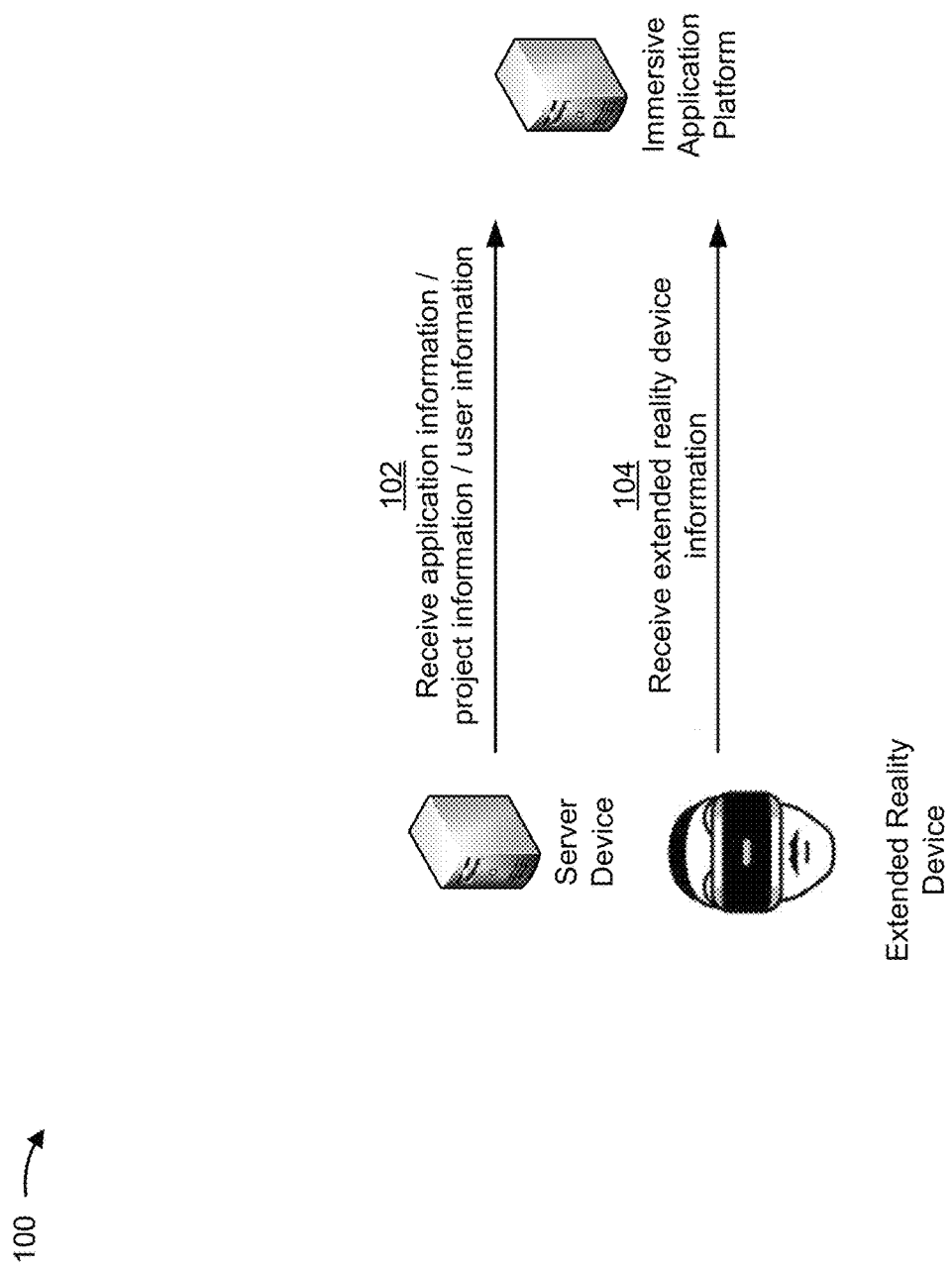
FIGS. 1A-1D are diagrams of an example implementation described herein.

The following detailed description of example implementations refers to the accompanying drawings. The same reference numbers in different drawings may identify the same or similar elements.

Software applications are increasingly becoming more intricate and complex, and span multiple technologies across distributed locations and data centers. Some software comprehension approaches may include reviewing design documents or navigating source code via integrated development environments. However, design documents may not be current and may therefore be inaccurate and/or misleading, and navigating source code may be very time consuming, non-intuitive, and may become directionless, which may cause difficulty in determining a current state of a software application being created or edited.

Some implementations, described herein, provide an immersive application platform that may automatically create immersive representations of software applications for extended reality devices. The immersive application platform may enable users of the extended reality devices to comprehend software applications via a more intuitive medium. In some implementations, the immersive application platform may perform a static analysis of a codebase associated with the software application to determine a structure of the codebase and one or more metrics associated with the codebase. The immersive application platform may generate a structured format of the codebase based on the structure of the codebase, may generate a domain specific language format of the codebase based on the structured format of the codebase and the one or more metrics associated with the codebase, and may generate an extended reality rendered view of the domain specific language format of the codebase. The immersive application platform may provide, to an extended reality device, the extended reality rendered view of the domain specific language format of the codebase.

In this way, the immersive application platform may automatically create an immersive representation of a codebase associated with a software application for display by an extended reality device, and may provide a user with faster and better understanding of the structure and relationships of the software application, which in turn allows for rapid software application development, modifications, and/or the like. Moreover, in this way, the immersive representation may be used for diverse business use cases, such as knowledge transfer, impact analysis, application modernization, and/or the like. Furthermore, implementations described herein use a computerized process to perform tasks that were not previously performed or were previously performed using subjective human intuition or input. For example, prior software comprehension approaches include reviewing design documents or navigating a codebase via integrated development environments. However, design documents are oftentimes out of date, which may be misleading and may cause confusion in the understanding and development of a software application. Moreover, navigating the codebase may be very time consuming, often non-intuitive, and may become directionless without the ability to view a holistic view of the software application. Finally, automatically creating the immersive representation of the software application for the extended device conserves computing resources (e.g., processors, memory, and/or the like) that would otherwise be wasted in unsuccessfully attempting to comprehend the software application using other techniques.

FIGS. 1A-1D are diagrams of an example implementation 100 described herein. As shown in FIGS. 1A-1D, implementation 100 may include a server device, an extended reality device, an immersive application platform, and/or the like.

The server device may store and/or transmit various types of information to the immersive application platform, to the extended reality device, and/or the like. The information may include application information associated with a software application, project information associated with the software application, and/or the like. In some implementations, the application information may include a codebase associated with the software application, one or more modifications to be made to the software application, design information for the software application, and/or the like. In some implementations, the project information may include information associated with a project for creating or editing the software application, a schedule for completing the project, priorities for different tasks of the project, software developer insight information (e.g., information including one or more insights associated with the project, the software application, the codebase, etc.), management insight information e.g., information including one or more insights associated with the project, the software application, the codebase, etc.), and/or the like.

The extended reality device may include an augmented reality device, a virtual reality device, a mixed reality device, and/or the like, that is capable of displaying an extended reality rendered view associated with a software application. In some implementations, the extended reality device may be a wearable device (e.g., a virtual reality headset, an augmented reality headset, etc.), a hand-held device (e.g., a smartphone, a tablet computer, etc.), another type of device (e.g., a server device, a desktop computer device, etc.), and/or the like. In some implementations, the extended reality device may provide information to the immersive application platform. For example, the extended reality device may provide information associated with the extended reality device, such as information identifying an extended reality device type associated with the extended reality device (e.g., an augmented reality device, a virtual reality device, a mixed reality device, etc.), environmental information associated with the extended reality device (e.g., information identifying one or more lighting parameters of the extended reality device, information identifying one or more spatial data parameters of the extended reality device, etc.), and/or the like; may provide information associated with a user using the extended reality device (e.g., a name of the user, a location of the user, a role of the user in a project associated a software application, one or more preferences of the user, etc.), and/or the like.

The immersive application platform may include one or more devices capable of receiving information from the server device, from the extended reality device, and/or the like; capable of generating an extended reality rendered view associated with a software application; capable of providing the extended reality rendered view of a software application to the extended reality device, the server device, and/or the like; capable of receiving an input, associated with the extended reality rendered view of a software application, from the extended reality device and/or another input device; capable of updating and/or modifying the extended reality rendered view of a software application; and/or the like.

In some implementations, the immersive application may include various components, such as a static analysis component, a domain specific language generator component (DSL generator component), a context component, a pre-rendering component, a post-rendering component, an interaction component, and/or the like.

In some implementations, the static analysis component may be capable of performing a static analysis of a codebase associated with a software application to generate a structured format of the codebase. For example, the static analysis component may perform the static analysis of the codebase associated with the software application by determining a structure and one or more metrics associated with the codebase, and generating the structured format of the codebase based on the determined structure and the one or more metrics.

In some implementations, the DSL generator component may generate a domain specific language format of the codebase from the structured format of the codebase and the one or more metrics. For example, the DSL generator component may convert the codebase from a native programming language of the codebase (e.g., Java, .Net, C++, etc.), to the domain specific language, which may be a programming language developed, optimized, and/or purposed for displaying the codebase in an extended reality view. In this way, the immersive application platform is capable of generating extended reality views in a programming language-agonistic way, which increases the compatibility of the immersive application platform for a variety of programming languages. In some implementations, the DSL generator component may further generate the domain specific language format of the codebase by annotating the domain specific language format of the codebase with the one or more metrics.

In some implementations, the context component may modify the domain specific language format of the codebase by including contextual information in the domain specific language format of the codebase, by modifying the annotations of the one or more metric, and/or the like. In some implementations, the pre-rendering component may generate an extended reality rendered view of the domain specific language format of the codebase.

In some implementations, the post-rendering component may modify the extended reality rendered view of the domain specific language format of the codebase, provide the extended reality view to the extended reality device, and/or the like. In some implementations, the interaction component may receive an input associated with the extended reality rendered view, may modify the extended reality view and/or generate a new extended reality view based on the input, and/or the like.

In some implementations, one or more components illustrated as being included in the immersive application platform may be included in the extended reality device. For example, the extended reality device may include the pre-rendering component, the post-rendering component, and/or the like.

Turning to FIG. 1A, a user may want to view an extended reality view of a particular codebase associated with a software application, and accordingly may provide input to the immersive application platform to generate the extended reality view of the codebase. As shown by reference number 102, the server device may provide information to the immersive application platform based on the input. In some implementations, the server device may provide the information based on receiving a request to provide the information from the immersive application platform, may automatically provide the information to the immersive application platform based on detecting the user providing the input to the immersive application platform to generate the extended reality view, and/or the like. The information may include application information associated with the software application, project information associated with the software application, and/or the like, as described above.

As shown by reference number 104, the extended reality device may provide information to the immersive application platform. In some implementations, the extended reality device may provide the information based on receiving a request to provide the information, such as when the immersive application platform requests the information; may automatically provide the information to the immersive application platform based on a user selecting a particular software application to view using the extended reality device, and/or the like. The information may include information associated with the extended reality device, information associated with the user, and/or the like, as described above.

Figure 1B:
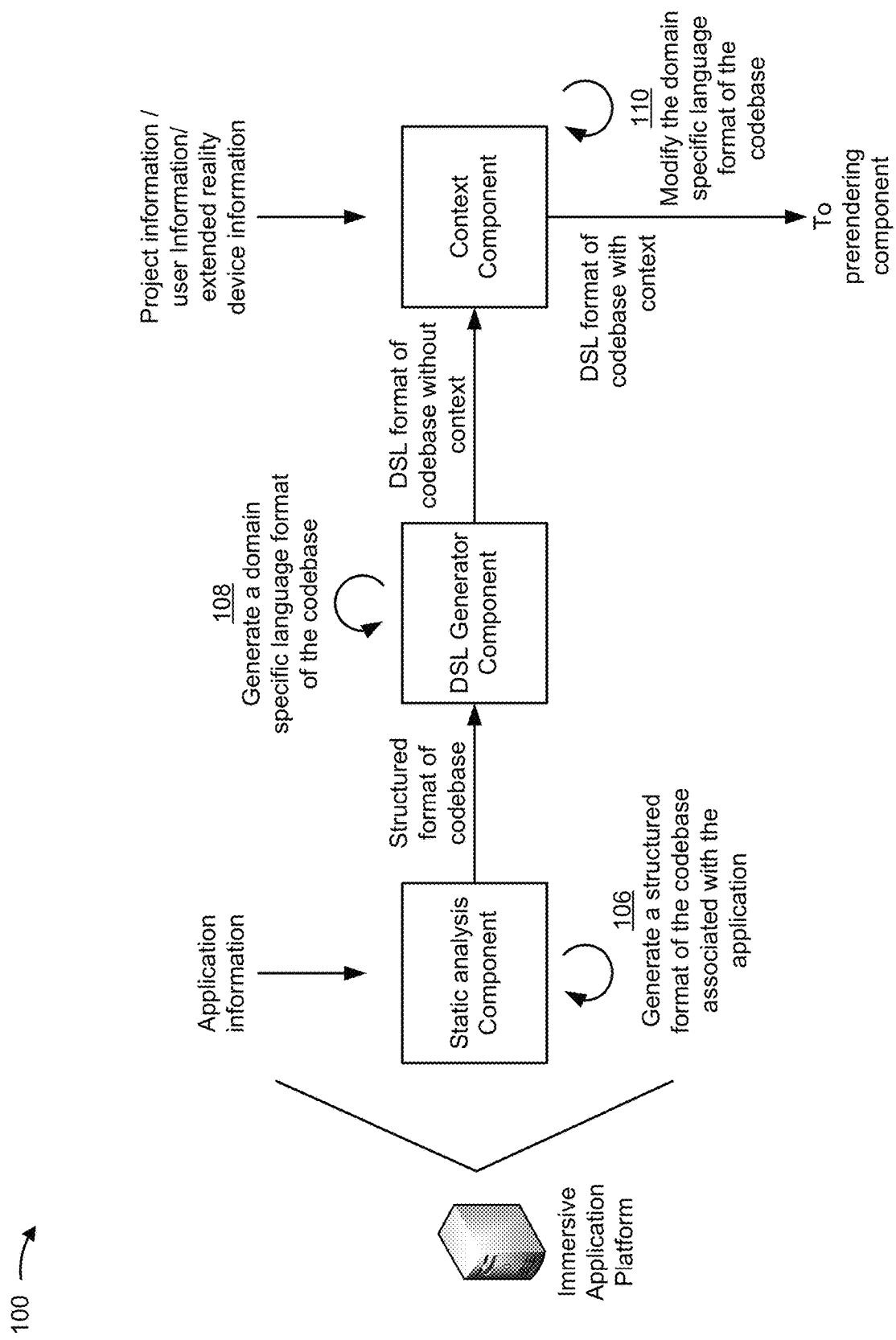

Turning to FIG. 1B, and as shown by reference number 106, the static analysis component may receive the application information, and the static analysis component may perform a static analysis (e.g., with a static analysis engine) on the application information. For example, the static analysis component may perform the static analysis on the codebase of the software application to generate a structured format of the codebase. In some implementations, the static analysis may include automatically analyzing the codebase of the software application to determine a structure of the codebase. The structure may include information identifying one or more packages, methods, classes, and/or the like, included in the codebase, one or more relationships between the packages, methods, classes, and/or the like.

In some implementations, the static analysis may include determining one or more metrics associated with the elements included in the codebase. The one or more metrics may include one or more metrics associated with the packages, methods, and/or classes, such as coupling between object classes (CBO) associated with a class (e.g., a quantity of relationships between the class and other classes included in the codebase), a complexity of a method (e.g., a quantity of lines of code in the method), a level of abstraction of a package (e.g., a metric that identifies a package's stability), a class responsibility of a class and/or a package (e.g., a metric that identifies a quantity of pre-conditions and/or post-conditions associated with the class and/or package), a class category relational cohesion of a class and/or a package (e.g., a quantity of relationships between classes in the class and/or package), a quantity of parents associated with a class and/or package (e.g., a quantity of other classes that are the parent of the class), and/or the like.

In some implementations, the static analysis component may generate the structured format of the codebase based on the structure and/or the one or more metrics associated with the codebase. The structured format of the codebase may include a graphical model of the codebase, and may be included in a structured electronic file, such as an extensible mark-up language (XML) file, a GraphML file, a JavaScript object notation (JSON) file, and/or the like of the code. The static analysis component may provide the structured format of the codebase to the DSL generator component.

The DSL generator component may receive the structured format of the codebase associated with the software application. As shown by reference number 108, the DSL generator component may generate a domain specific language format of the codebase based on the structured format of the codebase, based on the one or more metrics, and/or the like. For example, the DSL generator component may convert the graphical model of the codebase into a domain specific language representation or format of the codebase, which may serve as an intermediate model. The domain specific language may include a programming language configured, purposed, optimized, and/or the like, for representing the codebase using the extended reality device. In some implementations, the DSL generator component may generate the domain specific language representation or format of the codebase from the structured format of the codebase using a toolkit, one or more data stores, and/or the like, that includes information specifying how to convert variables, objects, operators, methods, expressions, meanings, context, and/or the like, of the original programming language associated with the codebase, to variables, objects, operators, methods, expressions, meanings, context, and/or the like, of the domain specific language.

In some implementations, the DSL generator component may annotate the domain specific language format of the codebase with the one or more metrics. For example, the DSL generator component may annotate the packages, classes, methods, and/or the like, included in the codebase with the one or more metrics associated with the packages, classes, methods, and/or the like.

In some implementations, the domain specific language format of the codebase may not include contextual information associated with the software application, associated with the project that is associated with the application, associated with the user, associated with the extended reality device, and/or the like. Accordingly, the DSL generator component may provide the domain specific language format of the codebase, without the contextual information, to the context component so that context component may modify the domain specific language format of the codebase to include the contextual information.

As shown in FIG. 1B, the context component may receive the project information, the user information, and/or the extended reality device information. As shown by reference number 110, the context component may modify the domain specific language format of the codebase based on the project information, the user information, and/or the extended reality device information to include contextual information in the domain specific language format of the codebase. For example, the context component may determine, based on the user information, the user's role in the project associated with the software application (e.g., a developer role, a manager role, a tester role, etc.); may determine, based on the project information, a phase of the project; and may identify, in the project information, one or more insights, associated with the user's role, to include in the domain specific language format of the codebase. For example, if the user is a tester in a testing phase, the user may benefit from a different set of insights and/or views than if the user was a developer in a development phase. As another example, the context component may modify (e.g., add, remove, change, etc.) the annotations of the one or more metrics that are included in the domain specific language format of the codebase based on the user's role, based on the project status, based on user preferences identified in the user information, and/or the like.

Figure 1C:
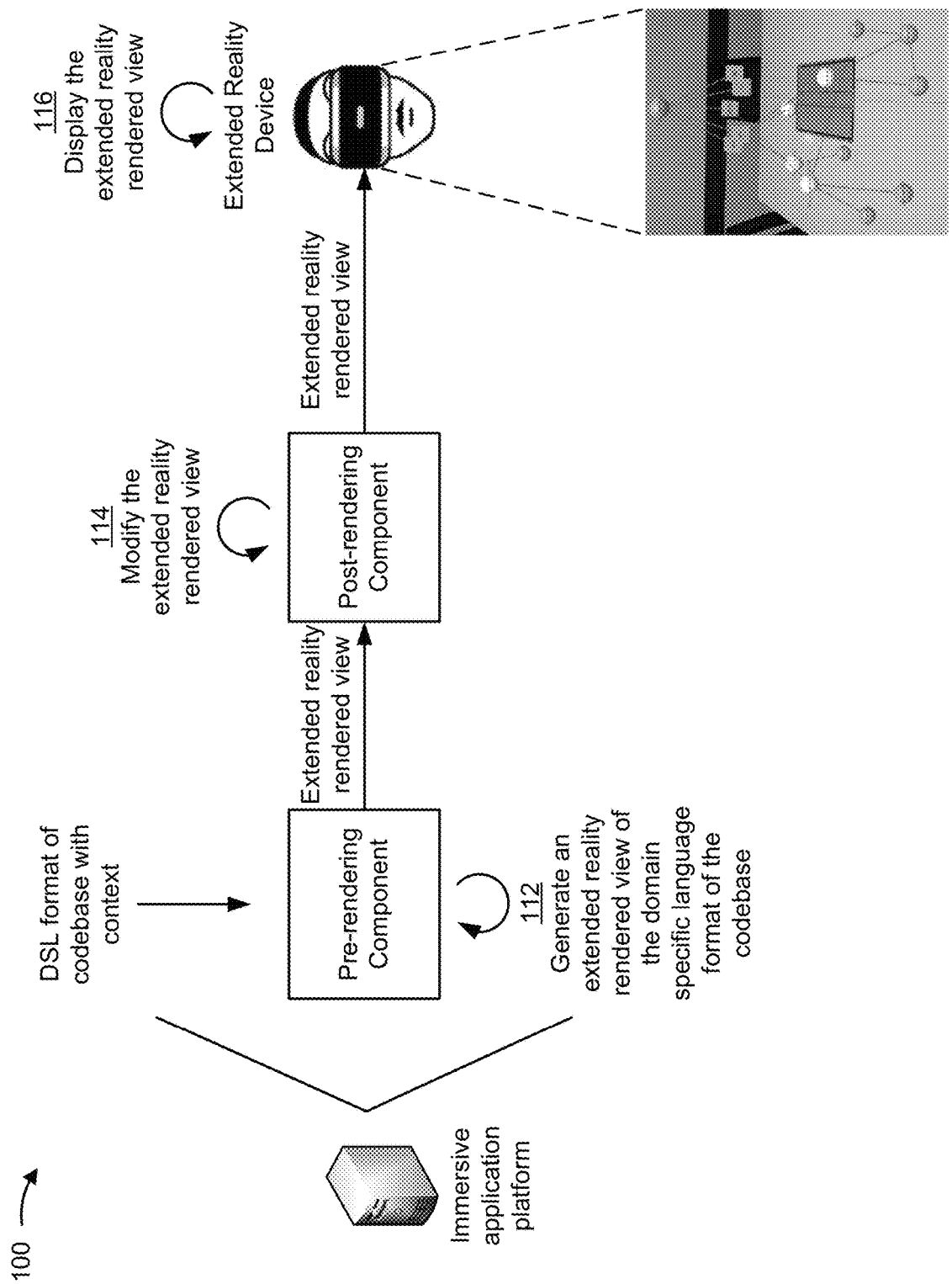

Turning to FIG. 1C, the context component may provide the domain specific language format of the codebase, which may include the contextual information described above, to the pre-rendering component. As shown by reference number 112, the pre-rendering component may receive the domain specific language format of the codebase, and may generate an extended reality rendered view of the domain specific language format of the codebase. In some implementations, to generate the extended reality rendered view, the pre-rendering component may select topology that is to be used to display the domain specific language format of the codebase in the extended reality rendered view. Examples of topologies that may be used to display the domain specific language format of the codebase include a three-dimensional tree hierarchy, a random topology, a three-dimensional undirected or directed graph, and/or the like. In some implementations, the pre-rendering component may select the topology based on one or more properties associated with the domain specific language format of the codebase, such as a quantity of elements (e.g., packages, classes, methods, etc.) included in the domain specific language format of the codebase, based on a quantity of relationships between elements (e.g., a quantity of relationships between elements of the same type, a quantity of relationships between elements of different types, etc.), and/or the like; based on one or more properties associated with the user, such as the role of the user; based on one or more properties associated with the project, such as a current stage of the project, priorities of the project, and/or the like.

Based on selecting the topology, the pre-rendering component may select one or more objects to be displayed in the topology. In some implementations, the one or more objects may represent the elements included in the codebase, may represent the relationships between the elements included in the codebase, and/or the like. In some implementations, the one or more objects may include various two-dimensional and/or three-dimensional shapes, such as a cube, a sphere, a prism, and/or the like; may include various two-dimensional and/or three-dimensional icons, such as a package icon, a box icon, and/or the like. In some implementations, the pre-rendering component may select the one or more objects based on the structure of the codebase, based on the contextual information included in the domain specific language format of the codebase, based on a type of programming language associated with the codebase, based on user input, and/or the like. In some implementations, the pre-rendering component may select a different object to represent each type of element included in the codebase.

The pre-rendering component may provide the extended reality rendered view of the domain specific language format of the codebase to the post-rendering component. As shown by reference number 114, the post-rendering component may modify the extended reality rendered view. In some implementations, the post-rendering component may modify the extended reality rendered view based on information provided by the extended reality device (e.g., the information associated with the extended reality device, the information associated with the user, etc.). For example, where the extended reality device is an augmented reality device or a mixed reality device, the post-rendering component may utilize a light estimation output, included in the lighting information provided by the extended reality device, in order to determine a level of transparency of the objects included in the extended reality rendered view, to determine a level of brightness of the objects included in the extended reality rendered view, and/or the like. In some implementations, the post-rendering device may utilize spatial information (e.g., information associated with one or more environmental objects included in the real world environment, information identifying an estimated space of the real world environment, etc.), included in the information associated with the extended reality device, to determine a size of the objects included in the extended reality rendered view, to determine a shape of the objects included in the extended reality rendered view, to determine a placement of the objects included in the extended reality rendered view, and/or the like. For example, as shown in FIG. 1C, the extended reality rendered view may include a three-dimensional graphical model, that includes objects and relationships between the objects, that is rendered on a real-world conference room table.

As shown by reference number 116, the extended reality device may display the extended reality rendered view of the domain specific language format of the codebase. In this way, the user of the extended reality device may view the extended reality rendered view of the domain specific language format of the codebase, may interact with the extended reality rendered view of the extended reality rendered view of the domain specific language format of the codebase, and/or the like.

In some implementations, the user may interact with the extended reality rendered view using various gestures, voice input, input via one or more input devices, and/or the like, to manipulate, modify, navigate, and/or change the extended reality view. For example, the user may interact with the extended reality view by using hand gestures (e.g., a swiping gesture to rotate the extended reality rendered view, a pinch gesture to zoom the extended reality rendered view, etc.), by using voice command (e.g., a voice command to focus in on a particular object in the extended reality view, etc.), and/or the like.

Figure 1D:
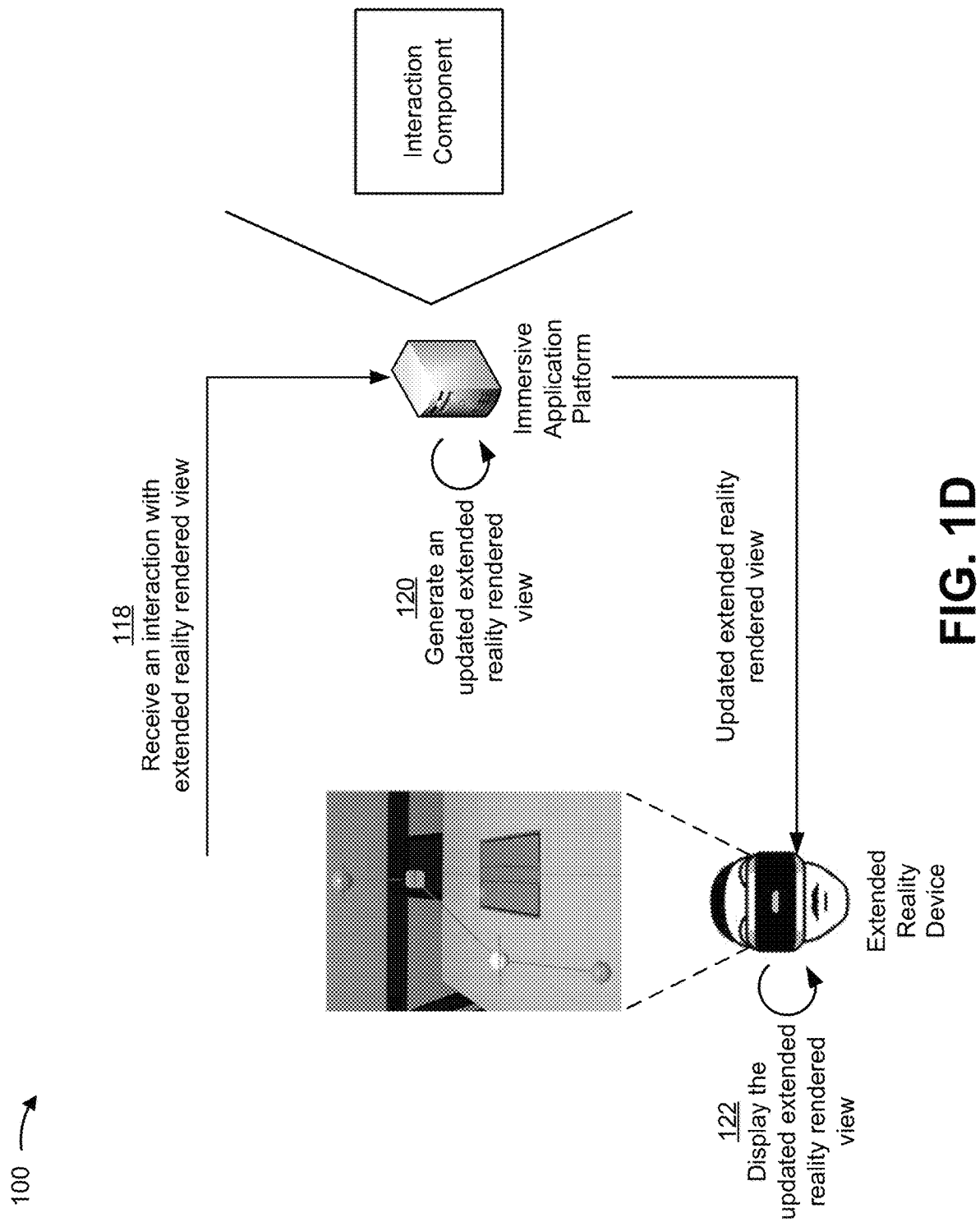

Turning to FIG. 1D, and as shown by reference number 118, the immersive application platform may receive an input associated with a user interaction with the extended reality rendered view of the domain specific language format of the codebase. For example, the interaction component of the immersive application platform may detect the interaction (e.g., a gesture, a voice command, an input via an input device, etc.), and determine whether the interaction is associated with one or more actions that are associated with the extended reality rendered view.

As shown by reference number 120, based on determining that the interaction is associated with one or more actions that are associated with the extended reality rendered view, the interaction component may generate a modified (e.g., a modified, manipulated, new, etc.) extended reality rendered view based on the one or more actions. For example, the interaction component may determine that the interaction is associated with a zoom action, and thus the interaction component may modify the extended reality rendered view by zooming in the extended reality view. As another example, the interaction component may determine that the interaction is associated with an action to generate a new extended reality rendered view that only includes a subset of one or more objects, and a subset of one or more relationships between the one or more objects, included in the extended reality view, and may generate the new extended reality rendered view based on the interaction.

As further shown in FIG. 1D, the immersive application platform may provide the modified extended reality rendered view to the extended reality device. As shown by reference number 122, the extended reality device may display the modified extended reality rendered view, and the user may view the modified extended reality rendered view, may interact with the modified extended reality rendered view, and/or the like.

In this way, the immersive application platform may be programming language and/or platform agnostic, may be immersive technology (e.g., augmented reality, virtual reality, mixed reality, etc.) agnostic, and may adapt a software application model based upon different types of extended reality devices being used. Further, in this way, the immersive application platform may enable a user of an extended reality device to view a representation of a structure of a software application, inter-element relationships of the software application, metrics of the software application, insights of the software application, and/or the like, in three-dimensional space, and to interact with (e.g., navigate, manipulate, and/or the like) the software application for specific insights.

Moreover, in this way, the immersive application platform may automatically create an immersive representation of a codebase associated with a software application for an extended reality device, and may provide a user with faster and better understanding of the structure and relationships of the software application, which in turn allows for rapid software application development, modifications, and/or the like. Furthermore, implementations described herein use a computerized process to perform tasks that were not previously performed or were previously performed using subjective human intuition or input. For example, prior software comprehension approaches include reviewing design documents or navigating a codebase via integrated development environments. However, design documents are oftentimes out of date, which may be misleading and may cause confusion in the understanding and development of a software application. Moreover, navigating the codebase may be very time consuming, often non-intuitive, and may become directionless without the ability to view a holistic view of the software application. Finally, automatically creating the immersive representation of the software application for the extended device conserves computing resources (e.g., processors, memory, and/or the like) that would otherwise be wasted in unsuccessfully attempting to comprehend the software application using other techniques.

As indicated above, FIGS. 1A-1D is provided merely as an example. Other examples are possible and may differ from what was described with regard to FIGS. 1A-1D.

Figure 2A:
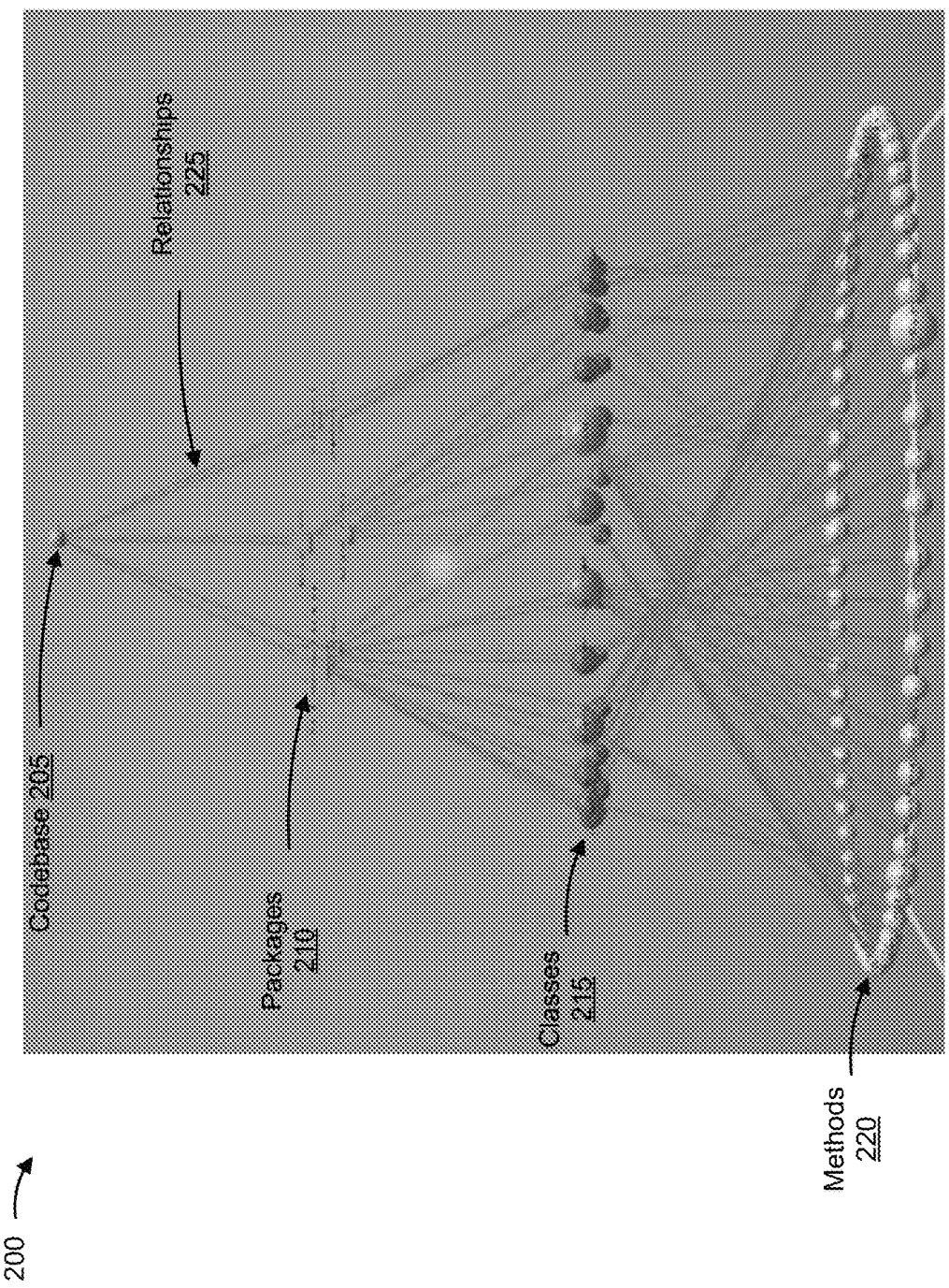
FIGS. 2A-2C are illustrations of example extended reality rendered views that may be generated by an immersive application platform described herein.
Figure 2B:
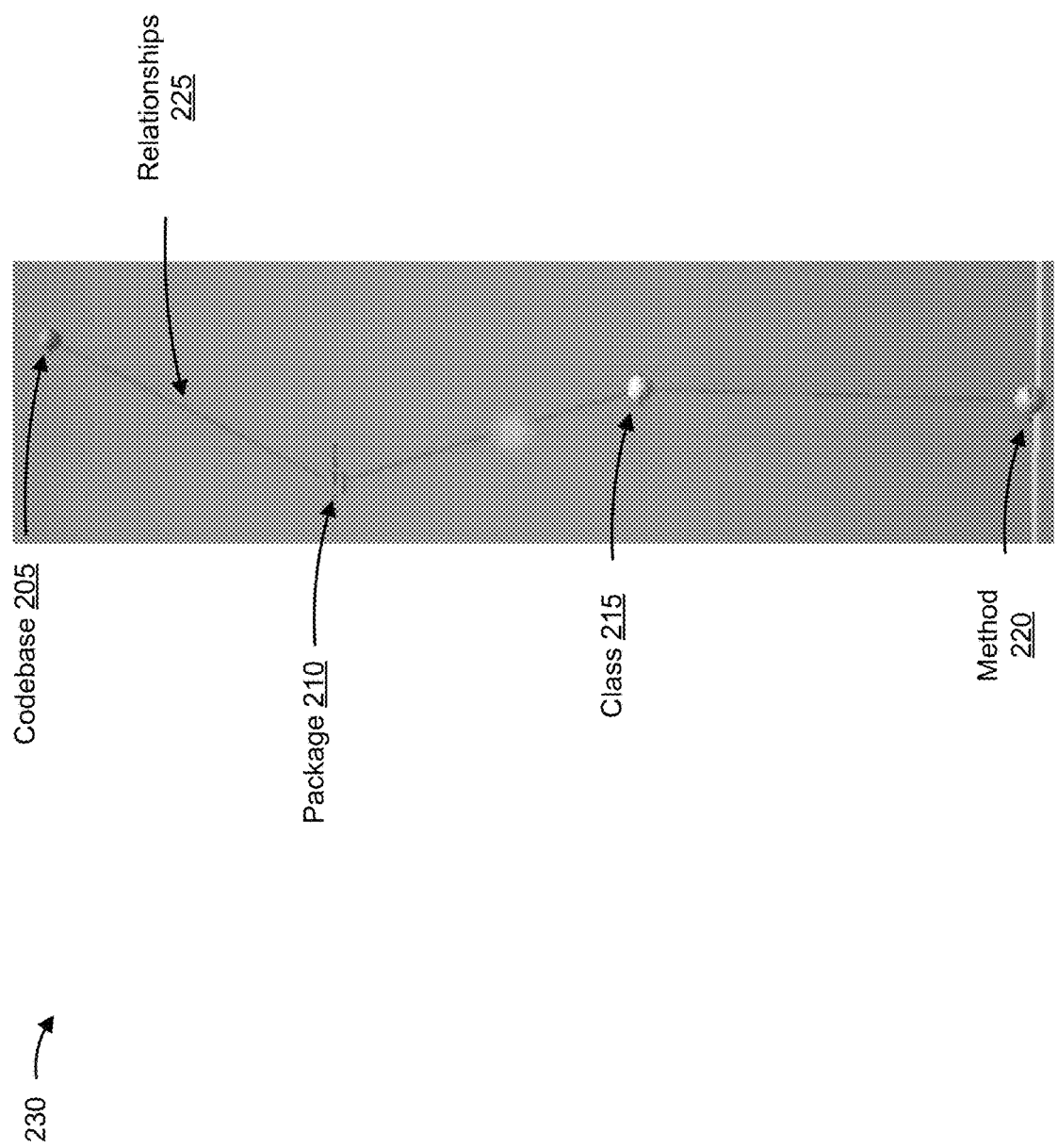
Figure 2C:
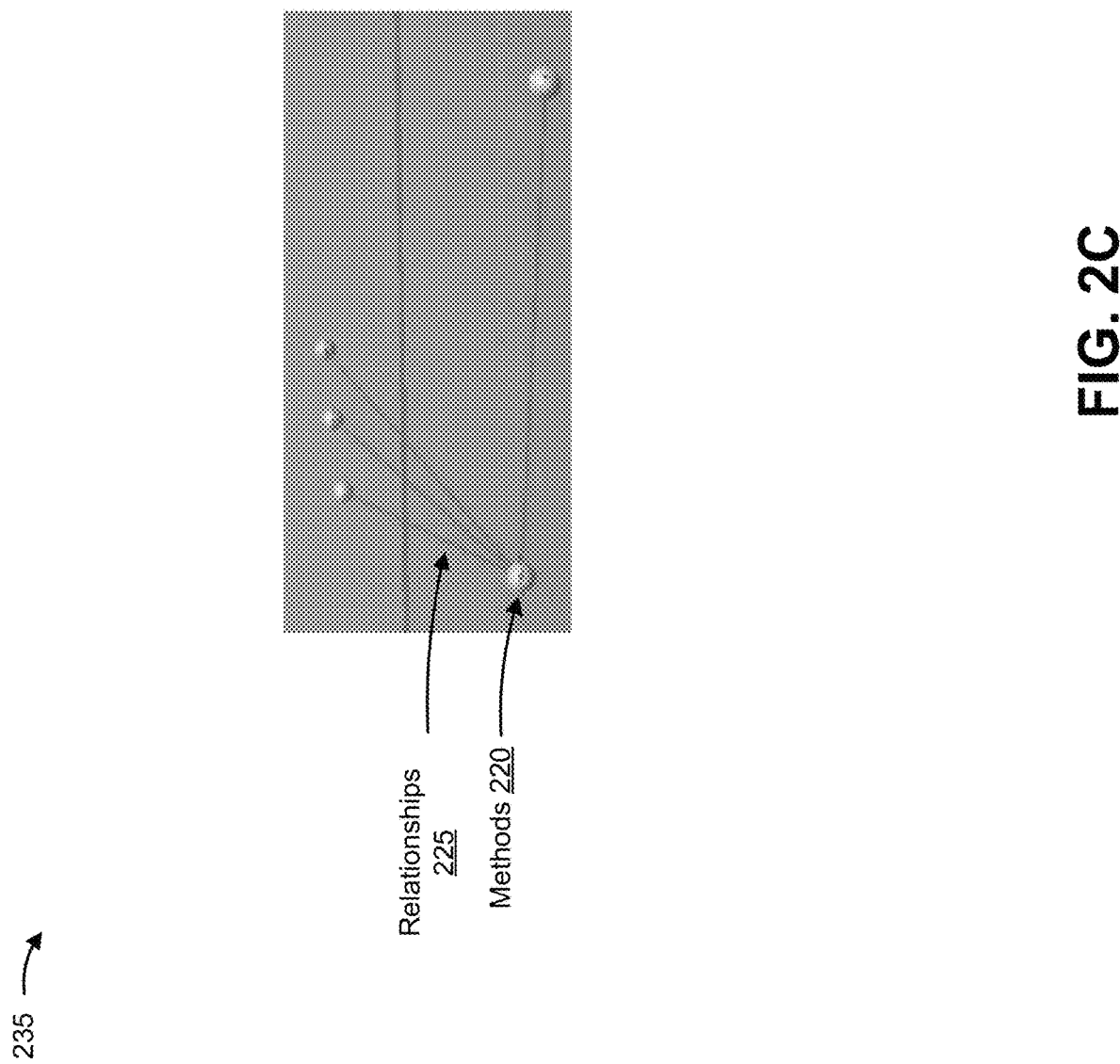

FIGS. 2A-2C are illustrations of example extended reality rendered views that may be generated by an immersive application platform, as described herein, and displayed by an extended reality device, as described herein.

As shown in FIG. 2A, extended reality rendered view 200, may display a codebase 205 in 3D form. In some implementations, extended reality rendered view 200 may include a hierarchical view of one or more elements included in codebase 205. For example, and as shown in FIG. 2A, extended reality rendered view 200 may include a rendering of one or more packages 210 (collectively referred to as "packages 210" and individually as "package 210") included in codebase 205, one or more classes 215 (collectively referred to as "classes 215" and individually as "class 215") included in packages 210, one or more methods 220 (collectively referred to as "methods 220" and individually as "method 220") included in classes 215, one or more relationship 225 (collectively referred to as "relationships 225" and individually as "relationship 225") between codebase 205, packages 210, classes 215, methods 220, and/or the like.

In some implementations, each element included in codebase 205 may be represented in extended reality rendered view 200 as an object. Different objects may be used to distinguish between different types of elements. For example, and as shown in FIG. 2A, packages 210 may be displayed as orange cubes, classes 215 may be displayed as red spheres, and methods 220 may be displayed as green spheres. Any other shapes, colors, and/or types of objects, and/or combinations thereof, may be used to represent the elements included in codebase 205. In some implementations, within a particular type of element, a visual indicator may be used to indicate a level of complexity included in a particular element of the particular type of element (e.g., a quantity of lines of code, a quantity of relationships with other elements, etc.). For example, and as shown in FIG. 2A, different shades of the color used for a particular type of element (e.g., different shades of red used for classes 215) may be used. Any other types of visual indicator may be used, such as the size of an object, an order of objects in extended reality rendered view 200, and/or the like.

In some implementations, a user may interact with extended reality rendered view 200 using various techniques, such as gesture (e.g., hand-movement gestures, arm-movement gestures, finger-movement gestures, head-movement gestures, etc.), a voice command, providing an input via an input device, and/or the like, to provide an input to the immersive application platform. For example, the user may use a pinch to zoom gesture to zoom in or out in extended reality rendered view 200, may use a voice command to select a particular element included in codebase 205, may use a swiping gesture to rotate the structure of codebase 205 in extended reality rendered view 200, and/or the like.

In some implementations, the immersive application platform may modify extended reality rendered view 200 based on the user's interaction with extended reality rendered view 200.

Turning to FIG. 2B, based on a user interaction with extended reality rendered view 200, the immersive application platform may generate an extended reality rendered view 230, and may provide extended reality rendered view 230 to the extended reality device for display by the extended reality device. For example, the user may interact with a particular element, such as a package 210, class 215, and/or method 220, and the immersive application platform may generate extended reality rendered view 230 such that extended reality rendered view 230 includes a hierarchical view of package 210, class 215, and/or method 220. As shown in FIG. 2B, extended reality rendered view 230 may include a rendering of class 215 included in package 210, method 220 included in class 215 that is included in package 210, the relationships 225 between codebase 205, package 210, class 215, and method 220, and/or the like. In this way, the user may view a particular element and one or more relationships 225 between the element and other elements included in the same hierarchy as the element.

Turning to FIG. 2C, based on a user interaction with extended reality rendered view 200, extended reality rendered view 230, and/or another extended reality rendered view, the immersive application platform may generate an extended reality rendered view 235, and may provide extended reality rendered view 235 to the extended reality device for display by the extended reality device. For example, the may interact with a particular element, such as a package 210, class 215, and/or method 220, and the immersive application platform may generate extended reality rendered view 235 such that extended reality rendered view 235 displays one or more relationships 225 between the particular element (e.g., a method 220) and other elements, included in codebase 205, of the same element type as the particular element. As shown in FIG. 2C, extended reality rendered view 235 may include a rendering of method 220 and one or more relationships 225 between method 220 and other methods 220 included in codebase 205. In this way, the user may view a particular element and one or more relationships 225 between the element and other elements, included in codebase 205, of the same element type as the particular element.

As indicated above, FIGS. 1A-1D is provided merely as an example. Other examples are possible and may differ from what was described with regard to FIGS. 1A-1D.

Figure 3:
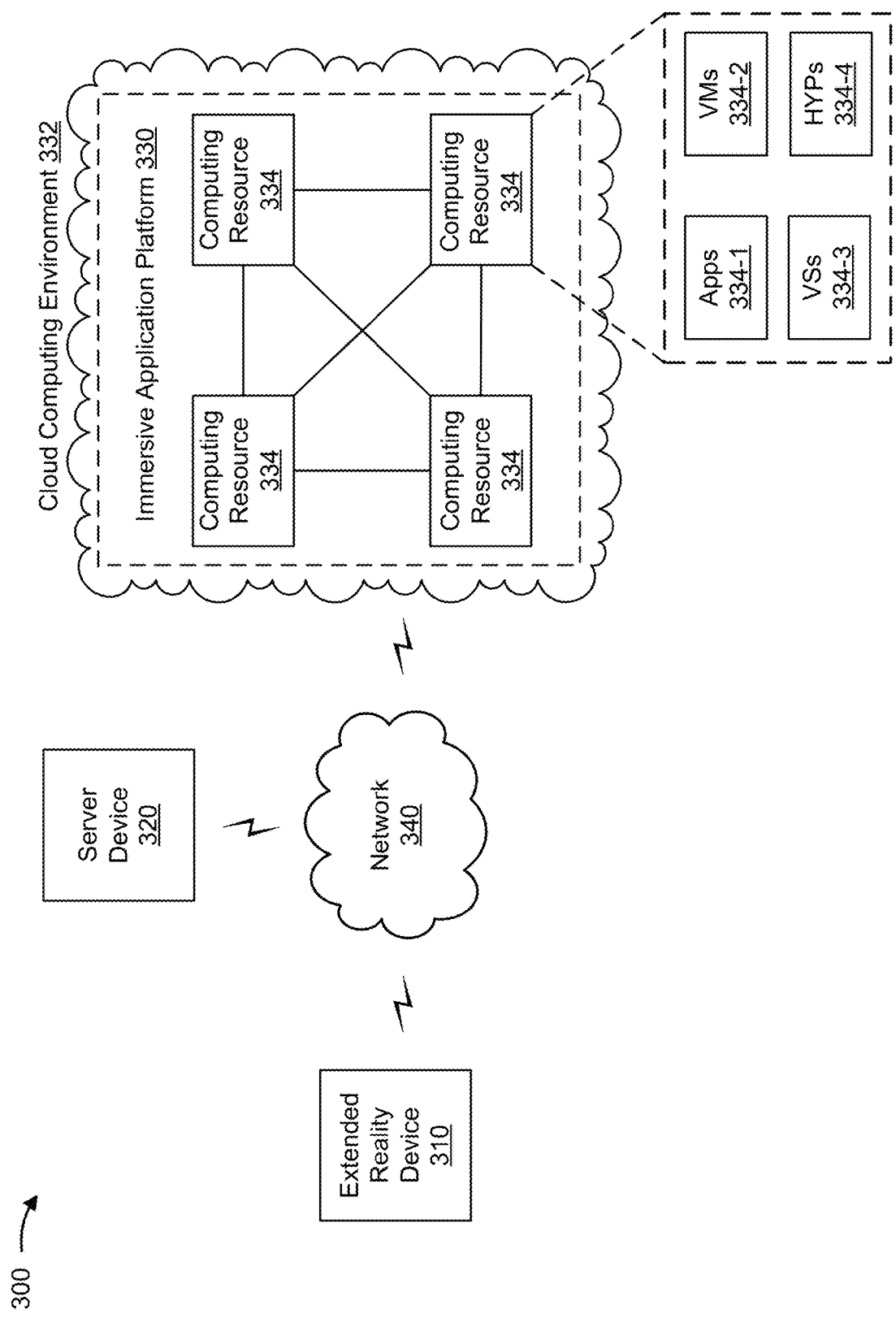
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include an extended reality device 310, a server device 320, an immersive application platform 330, a network 340, and/or the like. Devices of environment 300 may interconnect via wired connections, wireless connections, or a combination of wired and wireless connections.

Extended reality device 310 includes one or more devices capable of receiving, generating, storing, processing, and/or providing information, such as information described herein. For example, extended reality device 310 may receive information from and/or transmit information to immersive application platform 330, server device 320, and/or the like.

In some implementations, extended reality device 310 may include an augmented reality device, a virtual reality device, a mixed reality device, a gaming device, a wearable communication device (e.g., a smart wristwatch, a pair of smart eyeglasses, etc.), or a similar type of device. In some implementations, extended reality device 310 may be a hand-held device, a head-mounted device, another type of wearable device, and/or the like. In some implementations, extended reality device 310 may receive an extended reality rendered view of the domain specific language format of a codebase associated with a software application, may display the extended reality rendered view of the domain specific language format of the codebase, may receive an input associated with the extended reality rendered view of the domain specific language format of the codebase, may provide the input to immersive application platform 330, may receive a modified extended reality rendered view of the domain specific language format of the codebase, may display the extended reality rendered view of the domain specific language format of the codebase, and/or the like.

Server device 320 includes one or more devices capable of receiving, generating, storing, processing, and/or providing information, such as information described herein. For example, server device 320 may include a laptop computer, a tablet computer, a desktop computer, a server device, a group of server devices, or a similar type of device, which provides application information, project information, and/or the like, to immersive application platform 330. In some implementations, server device 320 may receive information from and/or transmit information to extended reality device 310 and/or immersive application platform 330.

Immersive application platform 330 includes one or more devices capable of automatically creating an immersive representation of a software application for extended reality device 310. For example, immersive application platform 330 may include one or more devices capable of receiving information from the server device, from the extended reality device, and/or the like; capable of generating an extended reality rendered view associated with a software application; capable of providing the extended reality rendered view of a software application to the extended reality device, the server device, and/or the like; capable of receiving an input, associated with the extended reality rendered view of a software application, from the extended reality device and/or another input device; capable of updating and/or modifying the extended reality rendered view of a software application; and/or the like.

In some implementations, immersive application platform 330 may be designed to be modular such that certain software components may be swapped in or out depending on a particular need. As such, immersive application platform 330 may be easily and/or quickly reconfigured for different uses. In some implementations, immersive application platform 330 may receive information from and/or transmit information to extended reality device 310 and/or server device 320.

In some implementations, as shown, immersive application platform 330 may be hosted in a cloud computing environment 332. Notably, while implementations described herein describe immersive application platform 330 as being hosted in cloud computing environment 332, in some implementations, immersive application platform 330 may not be cloud-based (i.e., may be implemented outside of a cloud computing environment) or may be partially cloud-based. Cloud computing environment 332 includes an environment that hosts immersive application platform 330. Cloud computing environment 332 may provide computation, software, data access, storage, etc. services that do not require end-user knowledge of a physical location and configuration of system(s) and/or device(s) that hosts immersive application platform 330. As shown, cloud computing environment 332 may include a group of computing resources 334 (referred to collectively as "computing resources 334" and individually as "computing resource 334").

Computing resource 334 includes one or more personal computers, workstation computers, server devices, or other types of computation and/or communication devices. In some implementations, computing resource 334 may host immersive application platform 330. The cloud resources may include compute instances executing in computing resource 334, storage devices provided in computing resource 334, data transfer devices provided by computing resource 334, etc. In some implementations, computing resource 334 may communicate with other computing resources 334 via wired connections, wireless connections, or a combination of wired and wireless connections.

As further shown in FIG. 3, computing resource 334 includes a group of cloud resources, such as one or more applications ("APPs") 334-1, one or more virtual machines ("VMs") 334-2, virtualized storage ("VSs") 334-3, one or more hypervisors ("HYPs") 334-4, and/or the like.

Application 334-1 includes one or more software applications that may be provided to or accessed by extended reality device 310. Application 334-1 may eliminate a need to install and execute the software applications on extended reality device 310. For example, application 334-1 may include software associated with immersive application platform 330 and/or any other software capable of being provided via cloud computing environment 332. In some implementations, one application 334-1 may send/receive information to/from one or more other applications 334-1, via virtual machine 334-2.

Virtual machine 334-2 includes a software implementation of a machine (e.g., a computer) that executes programs like a physical machine. Virtual machine 334-2 may be either a system virtual machine or a process virtual machine, depending upon use and degree of correspondence to any real machine by virtual machine 334-2. A system virtual machine may provide a complete system platform that supports execution of a complete operating system ("OS"). A process virtual machine may execute a single program, and may support a single process. In some implementations, virtual machine 334-2 may execute on behalf of a user (e.g., a user of extended reality device 310 or an operator of immersive application platform 330), and may manage infrastructure of cloud computing environment 332, such as data management, synchronization, or long-duration data transfers.

Virtualized storage 334-3 includes one or more storage systems and/or one or more devices that use virtualization techniques within the storage systems or devices of computing resource 334. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 334-4 may provide hardware virtualization techniques that allow multiple operating systems (e.g., "guest operating systems") to execute concurrently on a host computer, such as computing resource 334. Hypervisor 334-4 may present a virtual operating platform to the guest operating systems, and may manage the execution of the guest operating systems. Multiple instances of a variety of operating systems may share virtualized hardware resources.

Network 340 includes one or more wired and/or wireless networks. For example, network 340 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
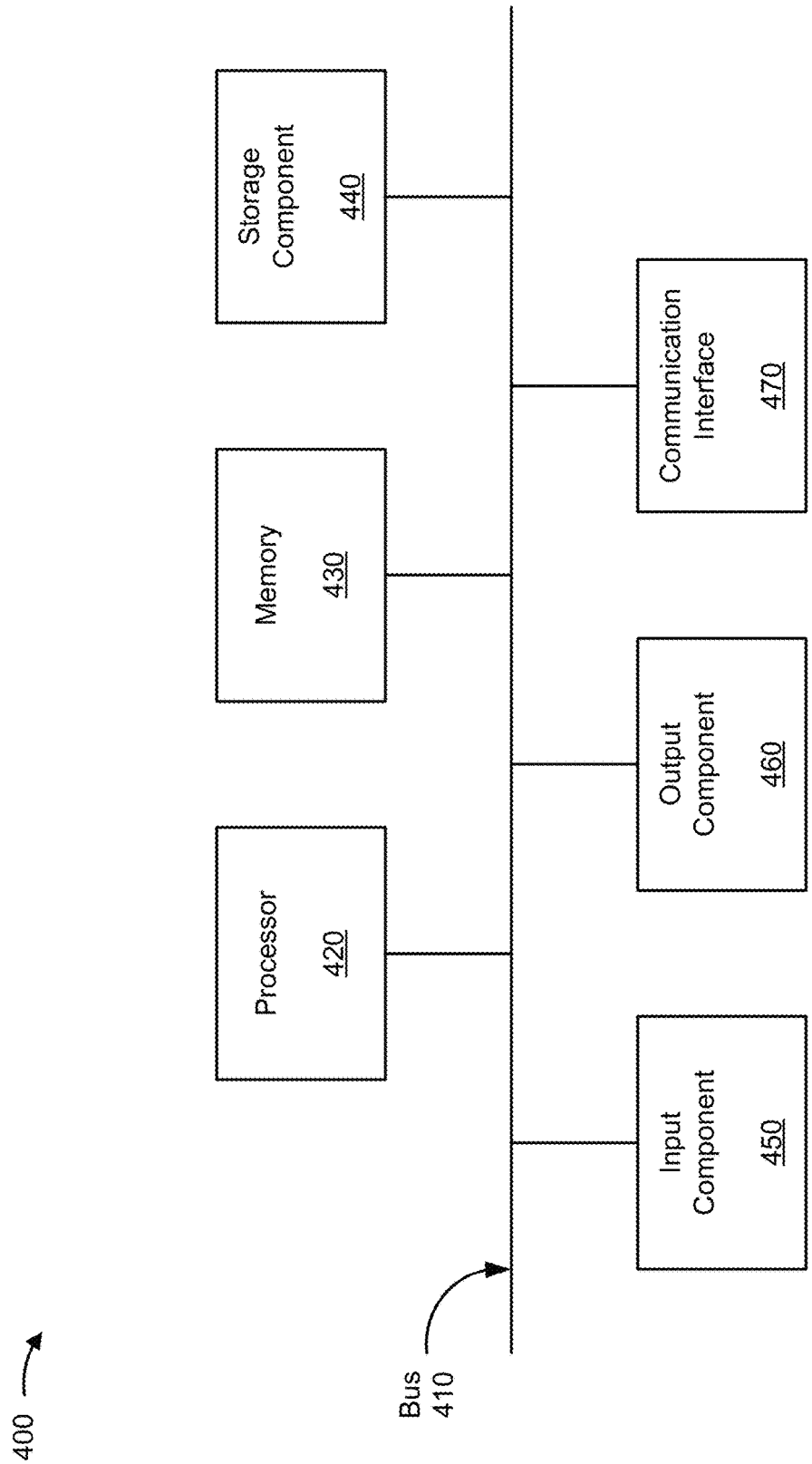
FIG. 4 is a diagram of example components of one or more devices of FIG. 3.

FIG. 4 is a diagram of example components of a device 400. Device 400 may correspond to extended reality device 310, server device 320, immersive application platform 330, computing resource 334, and/or one or more devices included in network 340. In some implementations, extended reality device 310, server device 320, immersive application platform 330, computing resource 334, and/or one or more devices included in network 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
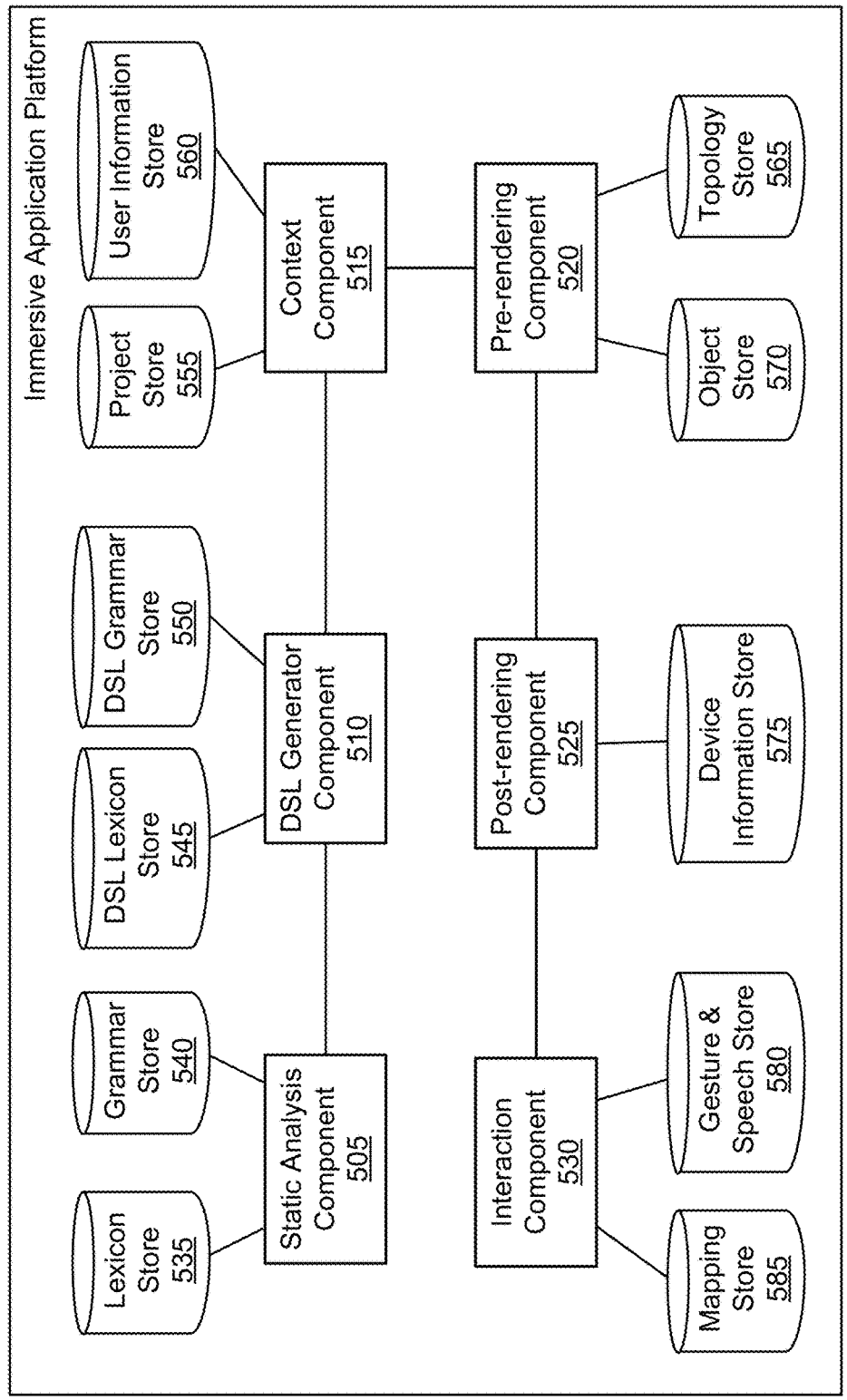
FIG. 5 is a diagram of an example immersive application platform of FIG. 3.

FIG. 5 is a diagram of an example immersive application platform (e.g., immersive application platform 500), as described herein. The immersive application platform may generate a representation of a software application for display be an extended reality device (e.g., extended reality device 310 of FIG. 3), as described herein. In some implementations, immersive application platform may be implemented by implemented by immersive application platform 330 of FIG. 3, by device 400 of FIG. 4, and/or the like.

As shown in FIG. 5, immersive application platform 500 may include various components, such as a static analysis component 505, a DSL generator component 510, a context component 515, a pre-rendering component 520, a post-rendering component 525, an interaction component 530, a lexicon store 535, a grammar store 540, a DSL lexicon store 545, a DSL grammar store 550, a project store 555, an user information store 560, a topology store 565, an object store 570, a device information store 575, a gesture and speech store 580, a mapping store 585, and/or the like. In some implementations, the components included in FIG. 5 may be implemented by separate components and/or devices, may be included in the same component and/or device, and/or the like.

Static analysis component 505 may perform a static analysis of a codebase associated with a software application to generate a structured format of the codebase. For example, static analysis component 505 may perform the static analysis of the codebase associated with the software application to determine a structure and one or more metrics associated with the codebase, as described above in reference to FIGS. 1A-1D. In some implementations, static analysis component 505 may perform the static analysis of the codebase based on information included in lexicon store 535, grammar store 540, and/or another data store. Lexicon store 535 may include information identifying various variables, objects, operators, methods, and/or the like, associated with a particular programming language (e.g., Java, .Net, C++, etc.). Grammar store 540 may include information identifying a syntax associated with a particular programming language. Static analysis component 505 may use the information, included in lexicon store 535, to identify variables, objects, operators, and/or the like, included in the codebase, and may use the information included in grammar store 540 to identify expressions, meanings, context, and/or the like, included in the codebase. Static analysis component 505 may generate a structured format of the codebase based on the structure and the one or more metrics associated with the codebase, as described above in reference to FIGS. 1A-1D.

DSL generator component 510 may generate a domain specific language format of the codebase based on the structured format of the codebase, as described above in reference to FIGS. 1A-1D. For example, DSL generator component 510 may generate the domain specific language format of the codebase based on information included in DSL lexicon store 545, DSL grammar store 550, and/or the like. In some implementations, DSL lexicon store 545 may include information mapping the lexicon of the programming language of the codebase to the lexicon of the domain specific language. For example, DSL lexicon store 545 may include information mapping the variables, objects, operators, methods, and/or the like, of the programming language associated with the codebase to the variables, objects, operators, methods, and/or the like, of the domain specific language. In some implementations, DSL grammar store 550 may include information mapping the syntax of the programming language of the codebase to the syntax of the domain specific language. For example, DSL grammar store 550 may include information mapping the expressions, meanings, context, and/or the like, of the programming language associated with the codebase to the expressions, meanings, context, and/or the like, of the domain specific language.

Context component 515 may modify the domain specific language format of the codebase, as described above in connection with FIGS. 1A-1D. For example, context component 515 may modify the domain specific language formation of the codebase by incorporating contextual information into the domain specific language format of the codebase based on project information stored in project store 555 (e.g., information associated with a project for creating or editing the software application, a schedule for completing the project, priorities for different tasks of the project, information including one or more software developer insights associated with the project, the software application, the codebase, information including one or more manager insights associated with the project, the software application, the codebase, etc.), based on user context information stored in user information store 560 (e.g., a name of the user, a location of the user, a role of the user in the project, a type of extended reality device being used by the user, etc.), and/or the like.

Pre-rendering component 520 may generate an extended reality rendered view of the domain specific language format of the codebase, as described above in connection with FIGS. 1A-1D and 2A-2C. For example, pre-rendering component 520 may generate the extended reality rendered view based on information included in topology store 565, information included in object store 570, and/or the like.

In some implementations, topology store 565 may include information identifying a plurality of different topologies that may be used to display the domain specific language format of the codebase in the extended reality rendered view. Pre-rendering component 520 may select a topology, from the plurality of different topologies included in topology store 565, that is to be used to display the domain specific language format of the codebase in the extended reality rendered view.

In some implementations, object store 570 may include information identifying a plurality of objects that may be used to represent elements included in the codebase. Pre-rendering component 520 may select one or more objects, of the plurality of objects, that are to be used to represent the elements included in the codebase.

Post-rendering component 525 may modify the extended reality rendered view of the domain specific language format of the codebase. In some implementations, post-rendering component 525 may modify the extended reality rendered view based on information included in device information store 575. For example, device information store 575 may include information associated with the extended reality device, such as lighting information, spatial information, information identifying an extended reality device type associated with the extended reality device, and/or the like.

Interaction component 530 may receive an input associated with a user interaction with the extended reality rendered view of the domain specific language format of the codebase, may modify the extended reality rendered view based on the interaction, and/or the like. For example, interaction component 530 may modify the extended reality rendered view based on information included in gesture and speech store 580, based on information included in mapping store 585, and/or the like.

In some implementations, gesture and speech store 580 may include information identifying one or more gestures (e.g., hand gestures, arm gestures, facial gestures, etc.), information identifying one or more voice commands, information identifying one or more inputs that may be received via another type of input device, and/or the like. Interaction component 530 may identify a gesture, a voice comment, and/or the like, associated with the user interaction, based on the information included in gesture and speech store 580.

In some implementations, mapping store 585 may include information mapping the gestures, the voice comments, the inputs that may be received from another type of input device, and/or the like, to one or more actions, associated with the extended reality rendered view, that interaction component 530 may perform. Interaction component 530 may identify, based on the information included in mapping store 585, an action, associated with the identified gesture, voice command, and/or other input, that is to be performed on the extended reality rendered view. Interaction component 530 may perform the action to modify the extended reality rendered view, and may provide the modified extended reality rendered view to the extended reality device for display by the extended reality device.

The number and arrangement of components shown in FIG. 5 are provided as an example. In practice, immersive application platform 500 may include additional components, fewer components, different components, or differently arranged components than those shown in FIG. 5. Additionally, or alternatively, a set of components (e.g., one or more components) of immersive application platform 500 may perform one or more functions described as being performed by another set of components of immersive application platform 500.

Figure 6:
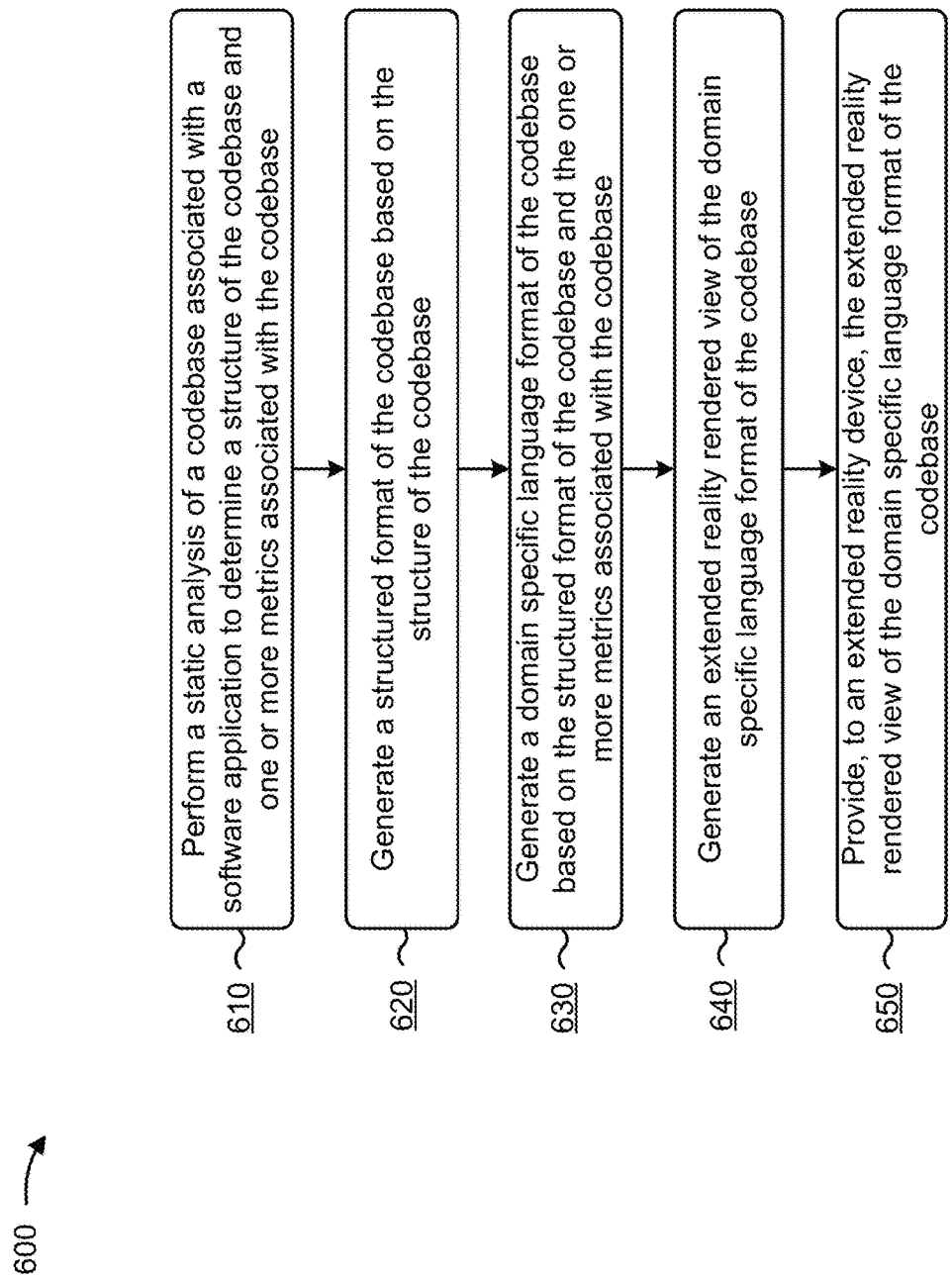
FIG. 6 is a flow chart of an example process for representing a software application using extended reality.

FIG. 6 is a flow chart of an example process 600 for representing a software application using extended reality. In some implementations, one or more process blocks of FIG. 6 may be performed by an immersive application platform, such as immersive application platform 330, immersive application platform 500, and/or the like. In some implementations, one or more process blocks of FIG. 6 may be performed by another device or a group of devices separate from or including the immersive application platform, such as an extended reality device (e.g., extended reality device 310), a server device (e.g., server device 320), and/or the like.

As shown in FIG. 6, process 600 may include performing a static analysis of a codebase associated with a software application to determine a structure of the codebase and one or more metrics associated with the codebase (block 610). For example, the immersive application platform (e.g., using processor 420, memory 430, storage component 440, input component 450, communication interface 470, and/or the like) may perform a static analysis of a codebase associated with a software application to determine a structure of the codebase and one or more metrics associated with the codebase, as described above in connection with FIGS. 1A-1D and/or FIG. 5.

As further shown in FIG. 6, process 600 may include generating a structured format of the codebase based on the structure of the codebase (block 620). For example, the immersive application platform (e.g., using processor 420, memory 430, storage component 440, output component 460, communication interface 470, and/or the like) may generate a structured format of the codebase based on the structure of the codebase, as described above in connection with FIGS. 1A-1D and/or FIG. 5.

As further shown in FIG. 6, process 600 may include generating a domain specific language format of the codebase based on the structured format of the codebase and the one or more metrics associated with the codebase (block 630). For example, the immersive application platform (e.g., using processor 420, memory 430, storage component 440, output component 460, communication interface 470, and/or the like) may generate a domain specific language format of the codebase based on the structured format of the codebase and the one or more metrics associated with the codebase, as described above in connection with FIGS. 1A-1D and/or FIG. 5.

As further shown in FIG. 6, process 600 may include generating an extended reality rendered view of the domain specific language format of the codebase (block 640). For example, the immersive application platform (e.g., using processor 420, memory 430, storage component 440, output component 460, communication interface 470, and/or the like) may generate an extended reality rendered view of the domain specific language format of the codebase, as described above in connection with FIGS. 1A-1D and/or FIG. 5.

As further shown in FIG. 6, process 600 may include providing, to an extended reality device, the extended reality rendered view of the domain specific language format of the codebase (block 650). For example, the immersive application platform (e.g., using processor 420, memory 430, storage component 440, output component 460, communication interface 470, and/or the like) may provide, to an extended reality device, the extended reality rendered view of the domain specific language format of the codebase, as described above in connection with FIGS. 1A-1D and/or FIG. 5.

Process 600 may include additional implementations, such as any single implementation or any combination of implementations described below and/or in connection with one or more other processes described elsewhere herein.

In some implementations, structure associated with the codebase may include at least one of one or more packages included in the codebase, one or more classes included in the codebase, or one or more methods included in the codebase. In some implementations, the one or more metrics may include at least one of coupling between object classes (CBO) associated with a class included in the codebase, a level of abstraction associated with a package included in the codebase, or a class responsibility associated with the class included in the codebase.

In some implementations, the extended reality rendered view of the domain specific language format of the codebase may include a hierarchical view, which may include a rendering of a plurality of objects associated with a plurality of elements included in the codebase, and a rendering of a plurality of representations of a plurality of relationships between the plurality of elements.

In some implementations, the immersive application platform may receive an input associated with a user interaction with the extended reality rendered view of the domain specific language format of the codebase, may modify the extended reality rendered view of the domain specific language format of the codebase based on receiving the input associated with the user interaction, and may provide the modified extended reality rendered view of the domain specific language format of the codebase to the extended reality device for display by the extended reality device.

In some implementations, the input associated with the user interaction with the extended reality rendered view of the domain specific language format of the codebase may include a user interaction with an object associated with a method included in the codebase, and the modified extended reality rendered view of the domain specific language format of the codebase may include a rendering of the object associated with the method, a rendering of another object associated with another method included in the codebase, and a rendering of a representation of a relationship between the method and the other method.

In some implementations, the immersive application platform may modify the domain specific language format of the codebase to include contextual information associated with at least one of a user of the extended reality device, or a project associated with the software application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for representing a software application using extended reality. In some implementations, one or more process blocks of FIG. 7 may be performed by an immersive application platform, such as immersive application platform 330, immersive application platform 500, and/or the like. In some implementations, one or more process blocks of FIG. 7 may be performed by another device or a group of devices separate from or including the immersive application platform, such as an extended reality device (e.g., extended reality device 310), a server device (e.g., server device 320), and/or the like.

As shown in FIG. 7, process 700 may include performing a static analysis of a codebase associated with a software application to determine a structure of the codebase and one or more metrics associated with the codebase (block 710). For example, the immersive application platform (e.g., using processor 420, memory 430, storage component 440, input component 450, communication interface 470, and/or the like) may perform a static analysis of a codebase associated with a software application to determine a structure of the codebase and one or more metrics associated with the codebase, as described above in connection with FIGS. 1A-1D and/or FIG. 5.

As further shown in FIG. 7, process 700 may include generating a structured format of the codebase based on the structure of the codebase (block 720). For example, the immersive application platform (e.g., using processor 420, memory 430, storage component 440, output component 460, communication interface 470, and/or the like) may generate a structured format of the codebase based on the structure of the codebase, as described above in connection with FIGS. 1A-1D and/or FIG. 5.

As further shown in FIG. 7, process 700 may include generating a domain specific language format of the codebase based on the structured format of the codebase and the one or more metrics associated with the codebase (block 730). For example, the immersive application platform (e.g., using processor 420, memory 430, storage component 440, output component 460, communication interface 470, and/or the like) may generate a domain specific language format of the codebase based on the structured format of the codebase and the one or more metrics associated with the codebase, as described above in connection with FIGS. 1A-1D and/or FIG. 5.

As further shown in FIG. 7, process 700 may include generating an extended reality rendered view of the domain specific language format of the codebase (block 740). For example, the immersive application platform (e.g., using processor 420, memory 430, storage component 440, output component 460, communication interface 470, and/or the like) may generate an extended reality rendered view of the domain specific language format of the codebase, as described above in connection with FIGS. 1A-1D and/or FIG. 5.

As further shown in FIG. 7, process 700 may include modifying the extended reality rendered view of the domain specific language format of the codebase, wherein the extended reality rendered view of the domain specific language format of the codebase is modified based on at least one of information associated with an extended reality device, or information associated with a user of the extended reality device (block 750). For example, the immersive application platform (e.g., using processor 420, memory 430, storage component 440, output component 460, communication interface 470, and/or the like) may modify the extended reality rendered view of the domain specific language format of the codebase, as described above in connection with FIGS. 1A-1D and/or FIG. 5. In some implementations, the extended reality rendered view of the domain specific language format of the codebase may be modified based on at least one of information associated with an extended reality device, or information associated with a user of the extended reality device.

As further shown in FIG. 7, process 700 may include providing, to the extended reality device, the modified extended reality rendered view of the domain specific language format of the codebase (block 760). For example, the immersive application platform (e.g., using processor 420, memory 430, storage component 440, output component 460, communication interface 470, and/or the like) may provide to the extended reality device, the modified extended reality rendered view of the domain specific language format of the codebase, as described above in connection with FIGS. 1A-1D and/or FIG. 5.

Process 700 may include additional implementations, such as any single implementation or any combination of implementations described below and/or in connection with one or more other processes described elsewhere herein.

In some implementations, the information associated with the extended reality device comprises at least one of lighting information associated with the extended reality device, or spatial information associated with the extended reality device. In some implementations, when generating the extended reality rendered view of the domain specific language format of the codebase, the immersive application platform may select a topology that is to be used to display the domain specific language format of the codebase in the extended reality rendered view of the domain specific language format of the codebase, may select one or more objects that are to be displayed in the topology.

In some implementations, the immersive application platform may receive an input associated with a user interaction with the extended reality rendered view of the domain specific language format of the codebase, may identify, based on receiving the input, at least one of a gesture associated with the user interaction, a voice command associated with the user interaction, and may modify the extended reality rendered view of the domain specific language format of the codebase based on the gesture or the voice command.

In some implementations, the immersive application platform may modify the domain specific language format of the codebase by including one or more annotations, associated with the one or more metrics, in the domain specific language format of the codebase. In some implementations, the immersive application platform may modify the one or more annotations based at least on one of a role associated with the user of the extended reality device, one or more preferences associated with the user, or a status of a project associated with the software application.

In some implementations, the one or more metrics may include at least one of a complexity of a method included in the codebase, a class category relational cohesion of a package included in the codebase, or a quantity of parents associated with a class included in the codebase.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for representing a software application using extended reality. In some implementations, one or more process blocks of FIG. 8 may be performed by an immersive application platform, such as immersive application platform 330, immersive application platform 500, and/or the like. In some implementations, one or more process blocks of FIG. 8 may be performed by another device or a group of devices separate from or including the immersive application platform, such as an extended reality device (e.g., extended reality device 310), a server device (e.g., server device 320), and/or the like.

As shown in FIG. 8, process 800 may include receiving a codebase associated with a software application (block 810). For example, the immersive application platform (e.g., using processor 420, memory 430, storage component 440, input component 450, communication interface 470, and/or the like) may receive a codebase associated with a software application, as described above in connection with FIGS. 1A-1D and/or FIG. 5.

As further shown in FIG. 8, process 800 may include performing a static analysis of the codebase to determine a structure of the codebase and one or more metrics associated with the codebase (block 820). For example, the immersive application platform (e.g., using processor 420, memory 430, storage component 440, output component 460, communication interface 470, and/or the like) may perform a static analysis of the codebase to determine a structure of the codebase and one or more metrics associated with the codebase, as described above in connection with FIGS. 1A-1D and/or FIG. 5.

As further shown in FIG. 8, process 800 may include generating a structured format of the codebase based on the structure of the codebase (block 830). For example, the immersive application platform (e.g., using processor 420, memory 430, storage component 440, output component 460, communication interface 470, and/or the like) may generate a structured format of the codebase based on the structure of the codebase, as described above in connection with FIGS. 1A-1D and/or FIG. 5.

As further shown in FIG. 8, process 800 may include generating a domain specific language format of the codebase based on the structured format of the codebase and the one or more metrics associated with the codebase (block 840). For example, the immersive application platform (e.g., using processor 420, memory 430, storage component 440, output component 460, communication interface 470, and/or the like) may generate a domain specific language format of the codebase based on the structured format of the codebase and the one or more metrics associated with the codebase, as described above in connection with FIGS. 1A-1D and/or FIG. 5.

As further shown in FIG. 8, process 800 may include modifying the domain specific language format of the codebase to include contextual information (block 850). For example, the immersive application platform (e.g., using processor 420, memory 430, storage component 440, output component 460, communication interface 470, and/or the like) may modify the domain specific language format of the codebase to include contextual information, as described above in connection with FIGS. 1A-1D and/or FIG. 5.

As further shown in FIG. 8, process 800 may include generating an extended reality rendered view of the modified domain specific language format of the codebase (block 860). For example, the immersive application platform (e.g., using processor 420, memory 430, storage component 440, output component 460, communication interface 470, and/or the like) may generate an extended reality rendered view of the modified domain specific language format of the codebase, as described above in connection with FIGS. 1A-1D and/or FIG. 5.

As further shown in FIG. 8, process 800 may include providing, to an extended reality device, the extended reality rendered view of the modified domain specific language format of the codebase (block 870). For example, the immersive application platform (e.g., using processor 420, memory 430, storage component 440, output component 460, communication interface 470, and/or the like) may provide, to an extended reality device, the extended reality rendered view of the modified domain specific language format of the codebase, as described above in connection with FIGS. 1A-1D and/or FIG. 5.

Process 800 may include additional implementations, such as any single implementation or any combination of implementations described below and/or in connection with one or more other processes described elsewhere herein.

In some implementations, the extended reality rendered view of the modified domain specific language format of the codebase may include a hierarchical view of the codebase that may include a rendering of a plurality of objects associated with a plurality of elements included in the codebase, wherein the plurality of elements may include a package included in the codebase, a class included in the package, and a method included in the class, and a rendering of a plurality of representations of a plurality of relationships between the plurality of elements, wherein the plurality of relationships may include a first relationship between the package and the class, and a second relationship between the class and the method.

In some implementations, the contextual information, included in the modified domain specific language format of the codebase, may be based on at least one of information associated with a project that is associated with the software application, information identifying one or more software developer insights associated with the software application, information associated with the extended reality device, or information associated with a user of the extended reality device.

In some implementations, the information associated with the extended reality device may include at least one of lighting information associated with the extended reality device, spatial information associated with the extended reality device, or information identifying an extended reality device type associated with the extended reality device.

In some implementations, the immersive application platform may receive an input associated with a user interaction with the extended reality rendered view of the domain specific language format of the codebase; may identify, based on receiving the input, at least one of a gesture associated with the user interaction or a voice command associated with the user interaction, may identify an action, associated with the extended reality rendered view of the domain specific language format of the codebase, that is mapped to the at least of the gesture or the voice command, and may perform the action to modify the extended reality rendered view of the domain specific language format of the codebase.

In some implementations, the one or more metrics may include at least one of coupling between object classes (CBO) associated with a class included in the codebase, a level of abstraction associated with a package included in the codebase, a class responsibility associated with the class included in the codebase, a complexity of a method included in the codebase, a class category relational cohesion of the package, or a quantity of parents associated with the class.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In this way, an immersive application platform 330 may automatically create an immersive representation of a codebase associated with a software application for display by an extended reality device 310, and may provide a user with faster and better understanding of the structure and relationships of the software application, which in turn allows for rapid software application development, modifications, and/or the like. Furthermore, implementations described herein use a computerized process to perform tasks that were not previously performed or were previously performed using subjective human intuition or input. For example, prior software comprehension approaches include reviewing design documents or navigating a codebase via integrated development environments. However, design documents are oftentimes out of date, which may be misleading and may cause confusion in the understanding and development of a software application. Moreover, navigating the codebase may be very time consuming, often non-intuitive, and may become directionless without the ability to view a holistic view of the software application. Finally, automatically creating the immersive representation of the software application for the extended device conserves computing resources (e.g., processors, memory, and/or the like) that would otherwise be wasted in unsuccessfully attempting to comprehend the software application using other techniques.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    performing, by a device, a static analysis of a codebase associated with a software application to determine a structure of the codebase and one or more metrics associated with the codebase;
    generating, by the device, a structured format of the codebase based on the structure of the codebase;
    generating, by the device, a domain specific language format of the codebase based on the structured format of the codebase and the one or more metrics associated with the codebase;
    modifying, by the device, the domain specific language format of the codebase by including one or more annotations, associated with the one or more metrics, in the domain specific language format of the codebase;
    generating, by the device, an extended reality rendered view of the modified domain specific language format of the codebase;
    modifying, by the device, the extended reality rendered view of the modified domain specific language format of the codebase,
        wherein the extended reality rendered view of the modified domain specific language format of the codebase is modified based on at least one of:
            information associated with an extended reality device, or
            information associated with a user of the extended reality device; and
    providing, by the device and to the extended reality device, the modified extended reality rendered view of the modified domain specific language format of the codebase.

2. The method of claim 1, wherein the information associated with the extended reality device comprises at least one of:
    lighting information associated with the extended reality device, or
    spatial information associated with the extended reality device.

3. The method of claim 1, wherein generating the extended reality rendered view of the modified domain specific language format of the codebase comprises:
    selecting a topology that is to be used to display the modified domain specific language format of the codebase in the extended reality rendered view of the modified domain specific language format of the codebase; and
    selecting one or more objects that are to be displayed in the topology.

4. The method of claim 1, further comprising:
    receiving an input associated with a user interaction with the extended reality rendered view of the modified domain specific language format of the codebase;
    identifying, based on receiving the input, at least one of:
        a gesture associated with the user interaction,
        a voice command associated with the user interaction; and
    modifying the extended reality rendered view of the modified domain specific language format of the codebase based on the gesture or the voice command.

5. The method of claim 1, further comprising:
    modifying the one or more annotations based at least on one of:
        a role associated with the user of the extended reality device,
        one or more preferences associated with the user, or
        a status of a project associated with the software application.

6. The method of claim 1, wherein the one or more metrics include at least one of:
    a complexity of a method included in the codebase,
    a class category relational cohesion of a package included in the codebase, or
    a quantity of parents associated with a class included in the codebase.

7. The method of claim 1, wherein the modified extended reality rendered view of the modified domain specific language format of the codebase comprises:
    a hierarchical view of the codebase, comprising:
        a rendering of a plurality of objects associated with a plurality of elements included in the codebase,
            wherein the plurality of elements comprises:
                a package included in the codebase,
                a class included in the package, and
                a method included in the class, and
        a rendering of a plurality of representations of a plurality of relationships between the plurality of elements,
            wherein the plurality of relationships comprises:
                a first relationship between the package and the class, and
                a second relationship between the class and the method.

8. A device, comprising:
    one or more memories; and
    one or more processors, communicatively coupled to the one or more memories, to:
        perform a static analysis of a codebase associated with a software application to determine a structure of the codebase and one or more metrics associated with the codebase;
        generate a structured format of the codebase based on the structure of the codebase;

generate a domain specific language format of the codebase based on the structured format of the codebase and the one or more metrics associated with the codebase;
modify the domain specific language format of the codebase by including one or more annotations, associated with the one or more metrics, in the domain specific language format of the codebase;
generate an extended reality rendered view of the modified domain specific language format of the codebase; and
provide, to an extended reality device, the extended reality rendered view of the modified domain specific language format of the codebase.

9. The device of claim 8, wherein the structure associated with the codebase includes at least one of:
one or more packages included in the codebase,
one or more classes included in the codebase, or
one or more methods included in the codebase.

10. The device of claim 8, wherein the one or more metrics include at least one of:
coupling between object classes (CBO) associated with a class included in the codebase,
a level of abstraction associated with a package included in the codebase, or
a class responsibility associated with the class included in the codebase.

11. The device of claim 8, wherein the extended reality rendered view of the modified domain specific language format of the codebase comprises:
a hierarchical view comprising:
a rendering of a plurality of objects associated with a plurality of elements included in the codebase, and
a rendering of a plurality of representations of a plurality of relationships between the plurality of elements.

12. The device of claim 8, wherein the one or more processors are further to:
receive an input associated with a user interaction with the extended reality rendered view of the modified domain specific language format of the codebase;
modify the extended reality rendered view of the modified domain specific language format of the codebase based on receiving the input associated with the user interaction; and
provide the modified extended reality rendered view of the modified domain specific language format of the codebase to the extended reality device for display by the extended reality device.

13. The device of claim 12, wherein the input associated with the user interaction with the extended reality rendered view of the modified domain specific language format of the codebase comprises:
a user interaction with an object associated with a method included in the codebase; and
wherein the modified extended reality rendered view of the modified domain specific language format of the codebase comprises:
a rendering of the object associated with the method,
a rendering of another object associated with another method included in the codebase, and
a rendering of a representation of a relationship between the method and the other method.

14. The device of claim 8, wherein the one or more processors, when modifying the domain specific language format of the codebase, are to:
modify the domain specific language format of the codebase to include contextual information associated with at least one of:
a user of the extended reality device, or
a project associated with the software application.

15. A non-transitory computer-readable medium storing instructions, the instructions comprising:
one or more instructions that, when executed by one or more processors, cause the one or more processors to:
receive a codebase associated with a software application;
perform a static analysis of the codebase to determine a structure of the codebase and one or more metrics associated with the codebase;
generate a structured format of the codebase based on the structure of the codebase;
generate a domain specific language format of the codebase based on the structured format of the codebase and the one or more metrics associated with the codebase;
modify the domain specific language format of the codebase by including one or more annotations, associated with the one or more metrics, in the domain specific language format of the codebase;
modify the modified domain specific language format of the codebase to include contextual information;
generate an extended reality rendered view of the modified domain specific language format of the codebase; and
provide, to an extended reality device, the extended reality rendered view of the modified domain specific language format of the codebase.

16. The non-transitory computer-readable medium of claim 15, wherein the extended reality rendered view of the modified domain specific language format of the codebase comprises:
a hierarchical view of the codebase, comprising:
a rendering of a plurality of objects associated with a plurality of elements included in the codebase,
wherein the plurality of elements comprises:
a package included in the codebase,
a class included in the package, and
a method included in the class, and
a rendering of a plurality of representations of a plurality of relationships between the plurality of elements,
wherein the plurality of relationships comprises:
a first relationship between the package and the class, and
a second relationship between the class and the method.

17. The non-transitory computer-readable medium of claim 15, wherein the contextual information, included in the modified domain specific language format of the codebase, is based on at least one of:
information associated with a project that is associated with the software application,
information identifying one or more software developer insights associated with the software application,
information associated with the extended reality device, or
information associated with a user of the extended reality device.

18. The non-transitory computer-readable medium of claim 15, wherein the information associated with the extended reality device comprises at least one of:

lighting information associated with the extended reality device, spatial information associated with the extended reality device, or information identifying an extended reality device type associated with the extended reality device.

19. The non-transitory computer-readable medium of claim 15, wherein the one or more instructions, when executed by the one or more processors, further cause the one or more processors to:

receive an input associated with a user interaction with the extended reality rendered view of the modified domain specific language format of the codebase;

identify, based on receiving the input, at least one of:
a gesture associated with the user interaction, or
a voice command associated with the user interaction; and identify an action, associated with the extended reality rendered view of the modified domain specific language format of the codebase, that is mapped to the at least of the gesture or the voice command; and perform the action to modify the extended reality rendered view of the modified domain specific language format of the codebase.

20. The non-transitory computer-readable medium of claim 15, wherein the one or more metrics include at least one of:

coupling between object classes (CBO) associated with a class included in the codebase, a level of abstraction associated with a package included in the codebase, a class responsibility associated with the class included in the codebase, a complexity of a method included in the codebase, a class category relational cohesion of the package, or a quantity of parents associated with the class.

* * * * *